US012786849B2

(12) United States Patent
Dong

(10) Patent No.: US 12,786,849 B2
(45) Date of Patent: Nov. 3, 2026

(54) METHOD AND APPARATUS FOR DETERMINING TAC OBTAINING MODE

(71) Applicant: Beijing Xiaomi Mobile Software Co., Ltd., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 844 days.

(21) Appl. No.: 18/034,592

(22) PCT Filed: Oct. 30, 2020

(86) PCT No.: PCT/CN2020/125578

§ 371 (c)(1),
(2) Date: Apr. 28, 2023

(87) PCT Pub. No.: WO2022/088108

PCT Pub. Date: May 5, 2022

(65) Prior Publication Data

US 2024/0031914 A1 Jan. 25, 2024

(51) Int. Cl.
*H04W 48/08* (2009.01)
*H04W 60/00* (2009.01)

(52) U.S. Cl.
CPC ........... *H04W 48/08* (2013.01); *H04W 60/00* (2013.01)

(58) Field of Classification Search
CPC ..... H04W 48/08; H04W 60/00; H04W 60/04; H04W 48/00; H04W 68/00
See application file for complete search history.

(56) References Cited

U.S. PATENT DOCUMENTS

| | | | |
|---|---|---|---|
| 6,529,723 | B1 | 3/2003 | Bentley |
| 2012/0309419 | A1 | 12/2012 | Lee et al. |
| 2021/0099947 | A1 | 4/2021 | Hong |

FOREIGN PATENT DOCUMENTS

| | | | |
|---|---|---|---|
| CN | 102036375 | A | 4/2011 |
| CN | 102958156 | A | 3/2013 |
| CN | 105592540 | A | 5/2016 |
| CN | 108702689 | A | 10/2018 |
| CN | 109076480 | A | 12/2018 |

(Continued)

OTHER PUBLICATIONS

ISA State Intellectual Property Office of the People's Republic of China, International Search Report Issued in Application No. PCT/CN2020/125578, Jul. 30, 2021, WIPO, 4 pages.

(Continued)

*Primary Examiner* — Marisol Figueroa
(74) *Attorney, Agent, or Firm* — Volpe Koenig

(57) ABSTRACT

A method and apparatus for improving operation of a wireless communication network. The wireless communication network is improved by determining a TAC obtaining mode includes: determining a first TAC obtaining mode supported by a network-side device; determining a second TAC obtaining mode supported by a terminal; and based on the first TAC obtaining mode and the second TAC obtaining mode, determining a mode of obtaining a target TAC. In the present disclosure, the terminal may, based on the TAC obtaining mode supported by the network-side device and the TAC obtaining mode supported by the terminal, select an appropriate TAC obtaining mode to obtain a TAC.

13 Claims, 5 Drawing Sheets

(56) References Cited

FOREIGN PATENT DOCUMENTS

| | | | | |
|---|---|---|---|---|
| CN | 109640316 | A | 4/2019 | |
| CN | 109905415 | A | 6/2019 | |
| CN | 110351702 | A | 10/2019 | |
| CN | 110574403 | A | 12/2019 | |
| CN | 111356229 | A | 6/2020 | |
| CN | 111614451 | A | 9/2020 | |
| CN | 111615175 | A | 9/2020 | |
| WO | WO-2012148329 | A1 * | 11/2012 | ............ H04W 48/10 |
| WO | WO-2017200453 | A1 * | 11/2017 | ............ H04W 60/04 |
| WO | 2020034324 | A1 | 2/2020 | |

OTHER PUBLICATIONS

State Intellectual Property Office of the People's Republic of China, Office Action and Search Report Issued in Application No. 202080002915X, May 13, 2023, 13 pages.

ISA State Intellectual Property Office of the People's Republic of China, Written Opinion of the International Searching Authority Issued in Application No. PCT/CN2020/125578, Jul. 30, 2021, WIPO, 9 pages.

* cited by examiner

METHOD AND APPARATUS FOR DETERMINING TAC OBTAINING MODE

CROSS-REFERENCE TO RELATED APPLICATION

This application is a National Stage of International Application No. PCT/CN2020/125578, filed on Oct. 30, 2020, the contents of all of which are incorporated herein by reference in their entirety.

TECHNICAL FIELD

The present disclosure relates to the field of communication technologies, and in particular to a method and an apparatus for determining a TAC obtaining mode, an electronic device, and a computer-readable storage medium.

BACKGROUND

In a mobile communication network, in order to facilitate management for a position of a terminal, a concept of a tracking area (TA) is established. Specifically, each TA is identified by a tracking area identity (TAI), where the TAI includes a Public Land Mobile Network (PLMN) and a tracking area code (TAC).

Generally, a network may configure a tracking area identity list (TAI list) for a terminal, and achieve management over the position of the terminal through the TAI list.

When a terminal moves, it is required to obtain a TAC corresponding to a current area to determine a tracking area to which the terminal belongs currently. If the tracking area is outside the TAI list, tracking area update (TAU)/Registration Area Update (RAU) are initiated to the network.

In the related arts, there are two major TAC obtaining modes: in one mode, TAC is obtained based on the network, and in the other mode, TAC is obtained based on the terminal. The two TAC obtaining modes have different processes. For a terminal, how to determine a TAC obtaining mode in different communication environments becomes a problem to be solved.

SUMMARY

In view of the above, embodiments of the present disclosure provide a method and an apparatus for determining a TAC obtaining mode, an electronic device, and a computer-readable storage medium so as to solve the technical problems in the related arts.

According to a first aspect of embodiments of the present disclosure, there is provided a method of determining a tracking area code (TAC) obtaining mode, which is applied to a terminal and includes:

determining a first TAC obtaining mode supported by a network-side device;

determining a second TAC obtaining mode supported by the terminal; and based on the first TAC obtaining mode and the second TAC obtaining mode, determining a mode of obtaining a target TAC.

According to a second aspect of embodiments of the present disclosure, there is provided an apparatus for determining a tracking area code (TAC) obtaining mode, which is applied to a terminal and includes:

a first determining module, configured to determine a first TAC obtaining mode supported by a network-side device;

a second determining module, configured to determine a second TAC obtaining mode supported by the terminal; and a target determining module, configured to, based on the first TAC obtaining mode and the second TAC obtaining mode, determine a mode of obtaining a target TAC.

According to a third aspect of embodiments of the present disclosure, there is provided a method of determining a tracking area code (TAC) obtaining mode, which is applied to a network-side device and includes:

sending indication information to a terminal, wherein the indication information is used to indicate a first TAC obtaining mode supported by the network-side device, for the terminal to determine a mode of obtaining a target TAC.

According to a fourth aspect of embodiments of the present disclosure, there is provided an apparatus for determining a tracking area code (TAC) obtaining mode, which is applied to a network-side device and includes:

a first indicating module, configured to send indication information to a terminal, where the indication information is used to indicate a first TAC obtaining mode supported by the network-side device such that the terminal determines a mode of obtaining a target TAC based on the indication information.

According to a fifth aspect of embodiments of the present disclosure, there is provided an electronic device, including: a processor; and a memory storing instructions executable by the processor;

where the processor is configured to perform the above method of determining a TAC obtaining mode.

According to a sixth aspect of embodiments of the present disclosure, there is provided a computer-readable storage medium, storing computer programs thereon, where the programs are executed by a processor to perform the steps of the above method of determining a TAC obtaining mode.

BRIEF DESCRIPTION OF THE DRAWINGS

In order to more clearly describe the technical solutions of the embodiments of the present disclosure, the accompanying drawing involved in the descriptions of the embodiments will be briefly introduced below. Obviously, the drawings described hereunder are only some embodiments of the present disclosure, and those skilled in the art may obtain other drawings based on these drawings without creative work.

DETAILED DESCRIPTION OF THE EMBODIMENTS

Figure 1:
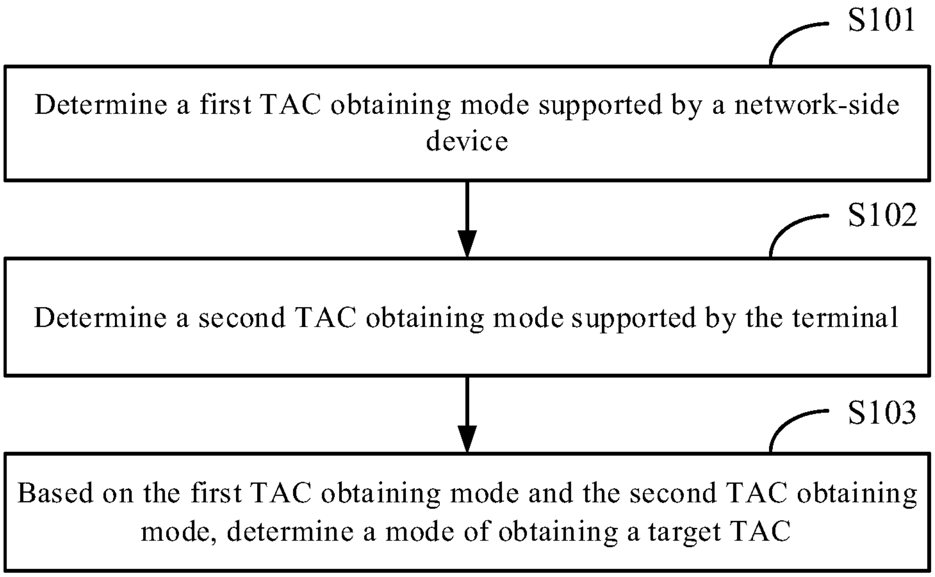
FIG. 1 is a schematic flowchart illustrating a method of determining a TAC obtaining mode according to an embodiment of the present disclosure.

The technical solutions of embodiments of the present disclosure will be described clearly and fully below in combination with drawings in the embodiments of the present disclosure. It is apparent that the described embodiments are merely some of the embodiments of the present disclosure rather than all embodiments. Other embodiments obtained by those of ordinary skill in the art based on the embodiments in the present disclosure without making creative work shall all fall within the scope of protection of the present disclosure.

In 5th-generation NR (New Radio), for a terminal (user device) in an idle state and a terminal in a non-active state, when a network has data to be sent to a terminal, a concept of a registration area (RA) is introduced such that the network can page the terminal and send the data to the terminal. The registration area is defined as a set of tracking areas (TA), and each TA includes one or more cells and corresponds to a particular geographical area.

Specifically, each TA is determined by a TA identity (TAI), and the TAI includes a public land mobile network (PLMN) and a tracking area code (TAC). The network sends the PLMNs and the TACs to the terminal by system message broadcast. Thus, a plurality of TAs are configured for the terminal by the network. Namely, the network configures one TAI list for the terminal.

When the terminal moves from a tracking area 1 (TA1) to a tracking area 2 (TA2), if the TA2 is not in the TAI list configured by the network for the terminal, the terminal needs to originate tracking area update (TAU)/registration area update (RAU) and thus a new TAI list for the terminal is configured by the network, so as to ensure the network can tack the terminal.

For TN (Terrestrial Network), if the terminal does not move, the network-broadcast TAC identified by the terminal will not change, and hence, the terminal will not perform TAU. For NTN (Non-Terrestrial Network), even if the terminal does not move, the network-broadcast TAC received by the terminal will change due to satellite movement. Thus, the terminal needs to perform TAU, which generates unnecessary signaling overhead and energy consumption.

Therefore, the NTN proposes a multi-TA solution to avoid TAU/RAU frequently originated by the terminal due to satellite movement. The NTN proposes a fixed-TA solution, which is implemented in the following mode. For NTN LEO (Low Earth Orbit), when a satellite moves from one area to another, the TAC broadcast by the satellite will change accordingly. For example, when a satellite 1 covers an area 1, the TAC broadcast by the satellite is TAC1; the satellite moves to an area 2, the TAC broadcast by the satellite is TAC2; when the satellite moves to an area 3, the TAC broadcast by the satellite is TAC3. In this way, frequent TAU can be avoided. For example, when the terminal is in the area 2, the TAC identified by the terminal from the network is TAC2. As long as the terminal does not move out of the area 2, there is no need to perform TAU.

The above method can be described as a network-based TAC solution, which means the terminal obtains a TAC from the network-broadcast TACs. Furthermore, a terminal-based TAC solution is also proposed, which means the terminal obtains a corresponding TAC based on the position information of the terminal. Detailed descriptions are made below.

The earth is divided into a plurality of geographical areas, each of which corresponds to one TAC. The correspondence is stored at the terminal end and the network end. Then, the terminal can obtain a corresponding TAC based on its own position information. The terminal reports its current TAI (TAC+PLMN) to the network and the network, after receiving the current TAI, confirms a geographical position of the terminal and further configures a TAI list for the terminal. For this solution, the network does not need to broadcast TAC, and the terminal does not obtain the TAC through the network. For ease of description, the solution can be referred to as a terminal-based TAC solution.

At present, only the network-based TAC solution is supported. If the terminal-based TAC solution is introduced later, there will be two solutions for the terminal to obtain a TAC. For the two solutions for obtaining TAC, it is usually not mandatory for the network and the terminal to support both the two solutions at the same time, and therefore, the network needs to negotiate with the terminal so as to determine a solution for the terminal to obtain a TAC.

When the two solutions for obtaining TAC, i.e., the network-based TAC solution and the terminal-based TAC solution, are both supported, a resolution mechanism between the network and the terminal is needed to determine a solution for the terminal to obtain a TAC.

FIG. 1 is a schematic flowchart illustrating a method of determining a TAC obtaining mode according to an embodiment of the present disclosure. The method of determining a TAC obtaining mode in this embodiment may be applied to a terminal. The terminal may include, but is not limited to, a smartphone, a tablet computer, a wearable device, a sensor, an internet-of-things device, and other electronic devices. The terminal may serve as a user device to communicate with a base station. The base station may include, but is not limited to, a 4G base station, a 5G base station, and a 6G base station.

As shown in FIG. 1, the method of determining a TAC obtaining mode may include the following steps.

At step S101, a first TAC obtaining mode supported by a network-side device is determined.

At step S102, a second TAC obtaining mode supported by the terminal is determined.

At present, the common TAC obtaining modes include a network-based obtaining TAC mode and a terminal-based obtaining TAC mode. The two TAC obtaining modes will be described below, respectively.

A first mode is the network-based obtaining TAC mode.

In this mode, the terminal obtains a TAC based on the TACs broadcast by the network-side device.

For example, the network-side device may include a core network and a base station. The base station may perform operations such as system message broadcast, and the core network may obtain and configure TAI and perform interactions with the terminal for registration and the like. The interactions between the core network and the terminal require the base station to forward relevant information, and thus the core network and the base station are collectively called the network-side device and will not be explained below.

For example, for non-terrestrial networks, the satellite determines a broadcast TAC based on an area to which the satellite moves, and the terminal obtains a TAC based on received broadcast information. For example, when the satellite moves to the area 1, the TAC broadcast by the satellite is TAC1; when the satellite moves to the area 2, the TAC broadcast by the satellite is TAC2; when the satellite moves to the area 3, the TAC broadcast by the satellite is TAC3. Thus, when the terminal is in the area 1, the terminal may obtain the TAC as TAC1 based on the network broadcast.

A second mode is the terminal-based obtaining TAC mode.

In this mode, the terminal first obtains a TAC based on its own position information, and then sends a TAI corresponding to the TAC to the network-side device. Hence, the network-side device may know current position information of the terminal and configure a TAI list corresponding to the position information for the terminal. For example, the configured TAI list includes the TAI reported by the terminal.

For example, the Earth is pre-divided into a plurality of geographical areas, each of which corresponds to one TAC. Subsequently, the terminal may, based on its own position information, query for a TAC corresponding to a geographical area to which the position information belongs, and send a corresponding TAI to the network-side device, such that the network-side device further configures a TAI list for the terminal.

In an embodiment, the terminal may firstly perform the step S101 to determine the first TAC obtaining mode supported by the network-side device and then perform the step S102 to determine the second TAC obtaining mode supported by the terminal. Alternatively, the terminal may firstly perform the step S102 and then perform the step S101, which is not limited herein.

For example, the network-side device includes a core network and/or a base station. The first TAC obtaining mode supported by the network-side device is a mode supported by both the core network and the base station. For example, if the core network and the base station both support the network-based obtaining TAC mode, the network-side device supports the network-based obtaining TAC mode; and if the core network and the base station both support the terminal-based obtaining TAC mode, the network-side device supports the terminal-based obtaining TAC mode.

In an embodiment, the first TAC obtaining mode and the second TAC obtaining mode include at least one of: a network-based obtaining TAC mode or a terminal-based obtaining TAC mode.

At step S103, based on the first TAC obtaining mode and the second TAC obtaining mode, a mode of obtaining a target TAC is determined.

In the embodiments of the present disclosure, the terminal may, based on the TAC obtaining mode supported by the network-side device and the TAC obtaining mode supported by the terminal, select a mode of obtaining a target TAC. In this way, a TAC can be obtained correctly, selection can be performed flexibly based on actual situations, and good compatibility with the environment is possessed.

In an embodiment, the terminal may determine a mode of obtaining the target TAC according to the specific implementation included in the first TAC obtaining mode and the second TAC obtaining mode.

Subsequently, the terminal may, based on the determined obtaining mode, obtain the target TAC to determine whether to perform TAU operation or the like.

In an embodiment, the terminal may also not obtain the target TAC but send other auxiliary information to the network to indicate to the network to determine a paging base station based on the auxiliary information at the time of paging the terminal.

In the embodiment shown in FIG. 1, the terminal may select an appropriate TAC obtaining mode for obtaining TAC from the TAC obtaining mode supported by the terminal and the TAC obtaining mode supported by the network-side device. In this way, a TAC can be correctly obtained, and selection can be performed flexibly in combination with actual situations. As a result, the compatibility with the communication environment is improved, and conflicts between different TAC obtaining modes can be avoided.

The present disclosure further provides a method of determining a TAC obtaining mode, which may include the following steps:

- determining a first TAC obtaining mode supported by a network-side device; and
- based at least on the first TAC obtaining mode, determining a mode of obtaining a target TAC.

The terminal may determine a mode of obtaining the target TAC based on the first TAC obtaining mode in combination with the auxiliary information. The auxiliary information may include: capability information of the terminal itself, environmental information of the terminal (for example, motion state and network environment and the like of the terminal) and/or pre-determined configuration (for example, mapping relationship and the like).

The present disclosure further provides a method of determining a TAC obtaining mode, which may include the following steps:

- determining a second TAC obtaining mode supported by the terminal; and
- based at least on the second TAC obtaining mode, determining a mode of obtaining a target TAC.

The terminal may determine a mode of obtaining the target TAC based on the second TAC obtaining mode in combination with the auxiliary information. The auxiliary information may include: signaling of the network-side device, capability information of the terminal, environmental information of the terminal (for example, motion state and network environment and the like of the terminal) and/or pre-determined configuration (for example, mapping relationship and the like).

In combination with the method shown in FIG. 1, the technical details of the methods are further described below. It should be understood that the specific implementations and embodiments of other technical details of the above methods are the same or similar and will not be repeated herein.

In the present disclosure, the terminal may determine the first TAC obtaining mode supported by the network-side device by at least two methods. One method will be described in combination with FIGS. 2 to 5 and the other method will be described in combination with FIG. 6.

Figure 2:
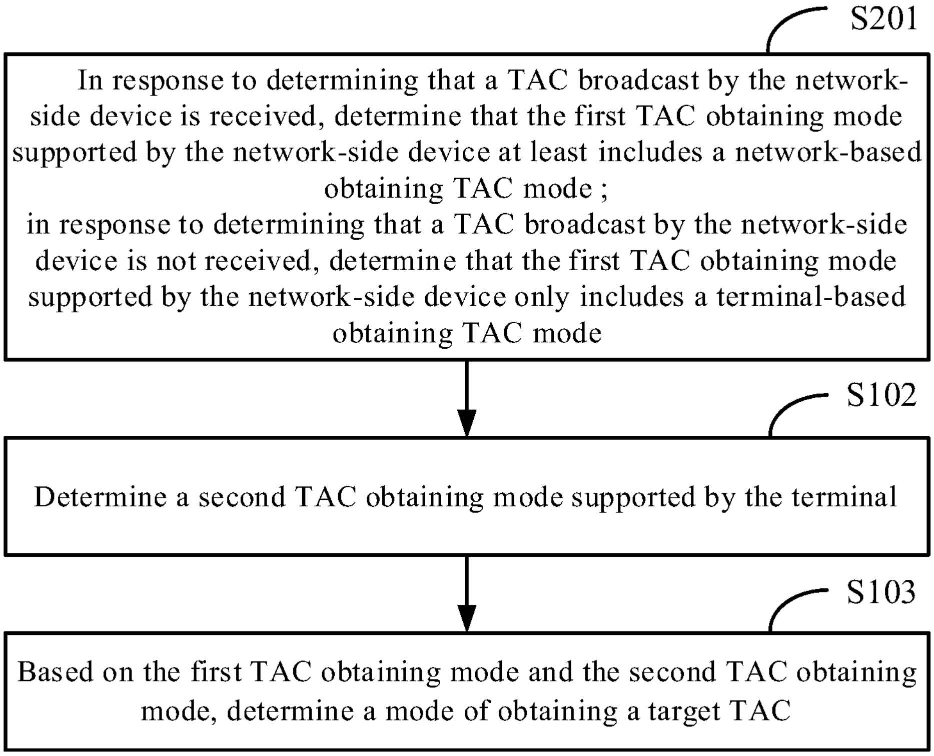
FIG. 2 is a schematic flowchart illustrating a method of determining a TAC obtaining mode according to another embodiment of the present disclosure.

FIG. 2 is a schematic flowchart illustrating a method of determining a TAC obtaining mode according to another embodiment of the present disclosure.

As shown in FIG. 2, determining the first TAC obtaining mode supported by the network-side device may include the following step.

At step S201, in response to receiving the TAC broadcast by the network-side device, it is determined that the first TAC obtaining mode supported by the network-side device at least includes a network-based obtaining TAC mode; in response to not receiving the TAC broadcast by the network-side device, it is determined that the first TAC obtaining mode supported by the network-side device only includes a terminal-based obtaining TAC mode.

In an embodiment, if the network-side device supports a network-based obtaining TAC mode, the TAC may be broadcast by the base station. After receiving the TAC broadcast by the base station, the terminal may determine that the network-side device supports the network-based obtaining TAC mode.

For example, the terminal determines that the network-side device supports the network-based obtaining TAC mode, which means the first TAC obtaining mode supported by the network-side device at least includes the network-based obtaining TAC mode and does not mean the network-side device only supports the network-based obtaining TAC mode.

In an embodiment, if the network-side device does not support the network-based obtaining TAC mode, the TAC will not be broadcast by the base station. If the terminal does not obtain the TAC from the system message broadcast by the base station, it is determined that the network-based obtaining TAC mode is not supported. Thus, the terminal may determine, based on the supported first TAC obtaining mode, that only the terminal-based obtaining TAC mode is supported.

Thus, the embodiment shown in FIG. 2 is completed. In the embodiment shown in FIG. 2, the terminal may perform preliminary determination on the first TAC obtaining mode based on whether the TAC broadcast by the base station is received. Further, in combination with the second TAC obtaining mode supported by the terminal itself, the terminal may determine a mode of obtaining a target TAC.

For the case of "receiving the TAC broadcast by the base station" in the above step S201, descriptions will be made in combination with embodiments 1 to 3; for the case of "not receiving the TAC broadcast by the base station" in the above step S201, descriptions will be made in combination with embodiments 4 to 5.

Embodiment 1: The first TAC obtaining mode at least includes the network-based obtaining TAC mode, and the second TAC obtaining mode is network-based obtaining TAC mode.

In an embodiment, in response to determining that the first TAC obtaining mode at least includes the network-based obtaining TAC mode and the second TAC obtaining mode is the network-based obtaining TAC mode, it is determined that the target TAC is obtained by the network-based obtaining TAC mode.

The terminal only supports the network-based obtaining TAC mode and does not support the terminal-based obtaining TAC mode. Therefore, the terminal, after confirming that the network-side device supports the network-based obtaining TAC mode, directly determines to obtain the target TAC by the network-based obtaining TAC mode.

In an embodiment, if the terminal selects the network-based obtaining TAC mode, the terminal will not report a TAI list to the network-side device. For example, in a process in which the terminal registers with the network-side device, the terminal does not report a TAI list but directly receives a TAI list configured by the network-side device.

Subsequently, the terminal may regularly receive the TAC broadcast by the base station and determine whether the broadcast TAC is outside the TAI list configured by the network-side device, and if yes (namely, the TAI corresponding to the broadcast TAC is not in the TAI list), the terminal may originate a tracking area update to the network-side device.

Embodiment 2: The first TAC obtaining mode at least includes the network-based obtaining TAC mode, and the second TAC obtaining mode includes the network-based obtaining TAC mode and the terminal-based obtaining TAC mode.

In an embodiment, in response to determining that the first TAC obtaining mode at least includes the network-based obtaining TAC mode and the second TAC obtaining mode includes the network-based obtaining TAC mode and the terminal-based obtaining TAC mode, it is determined to obtain the target TAC by the network-based obtaining TAC mode or by the terminal-based obtaining TAC mode.

The terminal supports the network-based obtaining TAC mode and the terminal-based obtaining TAC mode at the same time, and by broadcasting the TAC through the base station, it can only be determined that the first TAC obtaining mode at least includes the network-based obtaining TAC mode but it cannot be determined whether the first TAC obtaining mode supports the terminal-based obtaining TAC mode. Therefore, the terminal may select one implementation therefrom.

Embodiment 2.1: The terminal may obtain the target TAC by the network-based obtaining TAC mode, which will be described below in combination with FIG. 3.

Figure 3:
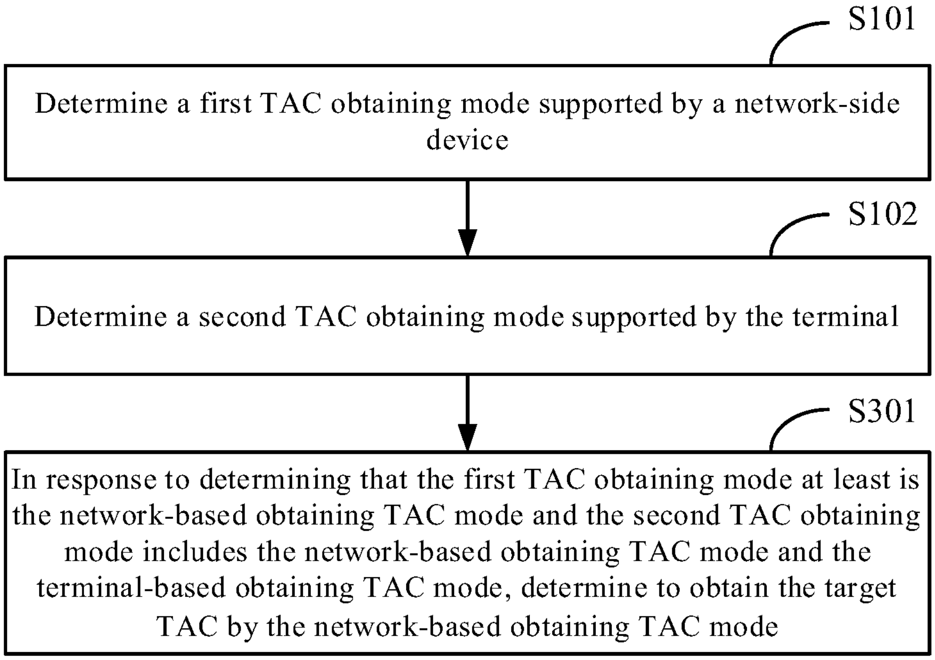
FIG. 3 is a schematic flowchart illustrating a method of determining a TAC obtaining mode according to yet another embodiment of the present disclosure.

FIG. 3 is a schematic flowchart illustrating a method of determining a TAC obtaining mode according to yet another embodiment of the present disclosure. As shown in FIG. 3, in response to determining that the first TAC obtaining mode at least includes the network-based obtaining TAC mode and the second TAC obtaining mode includes the network-based obtaining TAC mode and the terminal-based obtaining TAC mode, determining to obtain the target TAC by the network-based obtaining TAC mode or by the terminal-based obtaining TAC mode includes the following step.

At step S301, the target TAC is obtained by the network-based obtaining TAC mode.

In an embodiment, if the terminal selects the network-based obtaining TAC mode, the terminal will not report a TAI list to the network-side device. For example, in a process in which the terminal registers to the network-side device, the terminal does not report a TAI list but directly receives a TAI list configured by the network-side device. Subsequently, the terminal may obtain the target TAC by the network-based obtaining TAC mode and, based on whether the target TAC goes beyond the scope of the TAI list configured by the network-side device (i.e., whether the TAI corresponding to the target TAC is in the TAI list), determine whether to originate a tracking area update to the network-side device.

In an embodiment, the terminal may register by a registration request message, and the network may carry a TAI list in a registration accept message.

Embodiment 2.2: The terminal may obtain the target TAC by the terminal-based obtaining TAC mode, which will be described below in combination with FIG. 4.

Figure 4:
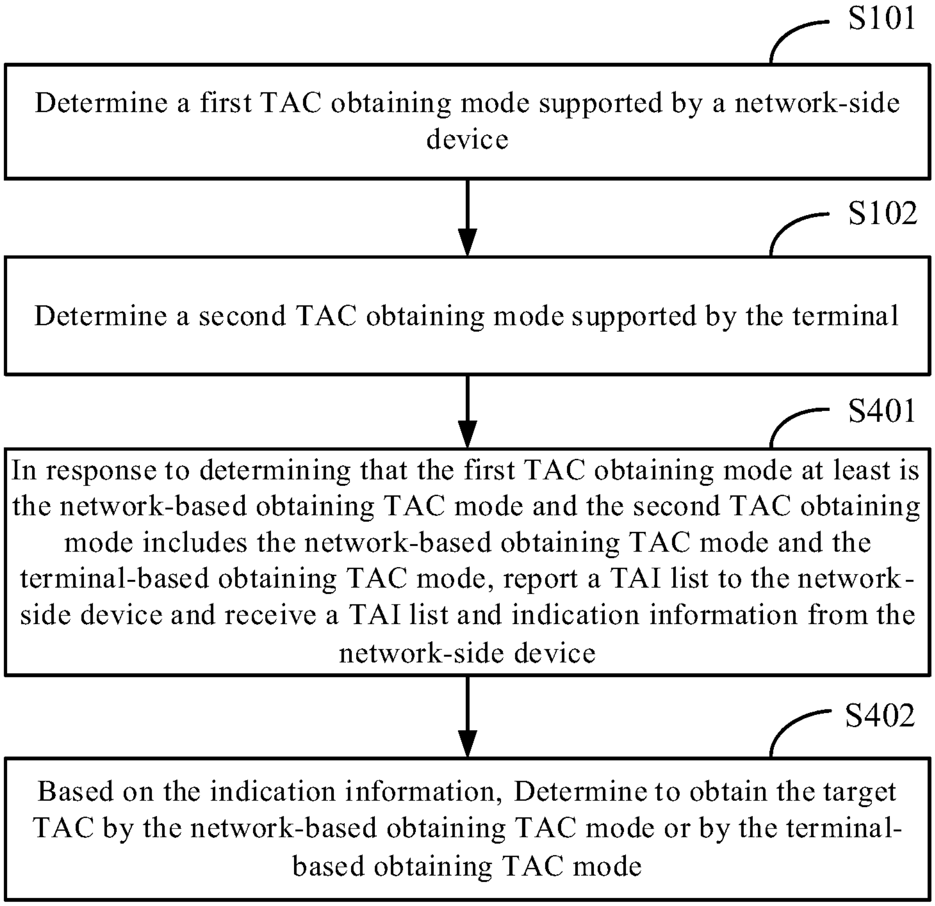
FIG. 4 is a schematic flowchart illustrating a method of determining a TAC obtaining mode according to still another embodiment of the present disclosure.

FIG. 4 is a schematic flowchart illustrating a method of determining a TAC obtaining mode according to still another embodiment of the present disclosure. As shown in FIG. 4, in response to determining that the first TAC obtaining mode at least includes the network-based obtaining TAC mode, and the second TAC obtaining mode includes the network-based obtaining TAC mode and the terminal-based obtaining TAC mode, determining to obtain the target TAC by the network-based obtaining TAC mode or by the terminal-based obtaining TAC mode includes the following steps.

At step S401, a TAI list is reported to the network-side device and indication information is received from the network-side device.

In an embodiment, the terminal may firstly obtain a TAC by the terminal-based obtaining TAC mode. Firstly, the terminal may determine position information based on its own positioning and then, based on a pre-stored correspondence between geographical area and TAC, determine one or more TACs corresponding to the position information.

In an embodiment, the terminal sends a TAI corresponding to at least one TAC to the network-side device. For example, the terminal may first determine a TAI corresponding to the TAC, then add the TAI to the TAI list, and then report the TAI list to the network-side device. In an embodiment, the terminal may carry the TAI list, for example, in the registration request message in a registration process.

In an embodiment, the TAI list may include one or more TAIs. For example, the TAI list may be in the form of a table or list to indicate a plurality of TAIs or take another form, which is not limited herein.

In an embodiment, the terminal may also report the second TAC obtaining mode supported by the terminal to the network-side device. For example, the terminal may report the second TAC obtaining mode to the network by another indication information. For example, two indication identifiers are carried to respectively indicate whether the terminal supports the terminal-based obtaining TAC mode and the network-based obtaining TAC mode.

For example, the terminal reports the TAI list to the network, which means the terminal supports the terminal-based obtaining TAC mode. Therefore, the terminal may only indicate to the network whether the terminal supports the network-based obtaining TAC mode without indicating whether the terminal supports the terminal-based obtaining TAC mode.

In an embodiment, after receiving the TAI list and the indication information reported from the terminal, the network-side device may determine the second TAC obtaining mode supported by the terminal. Then, the network-side device may, based on the first TAC obtaining mode supported by itself, send indication information to the terminal, where the indication information is used to indicate the first TAC obtaining mode supported by the network-side device. In an embodiment, the network may carry the indication information in the registration accept message.

At step S402, based on the indication information, it is determined to obtain the target TAC by the network-based obtaining TAC mode or by the terminal-based obtaining TAC mode.

In an embodiment, the terminal may firstly determine the second TAC obtaining mode supported by the network-side device based on the network-sent indication information. Based on this, the terminal may further determine which mode is used to obtain the target TAC. Descriptions will be made below in combination with FIG. 5.

Figure 5:
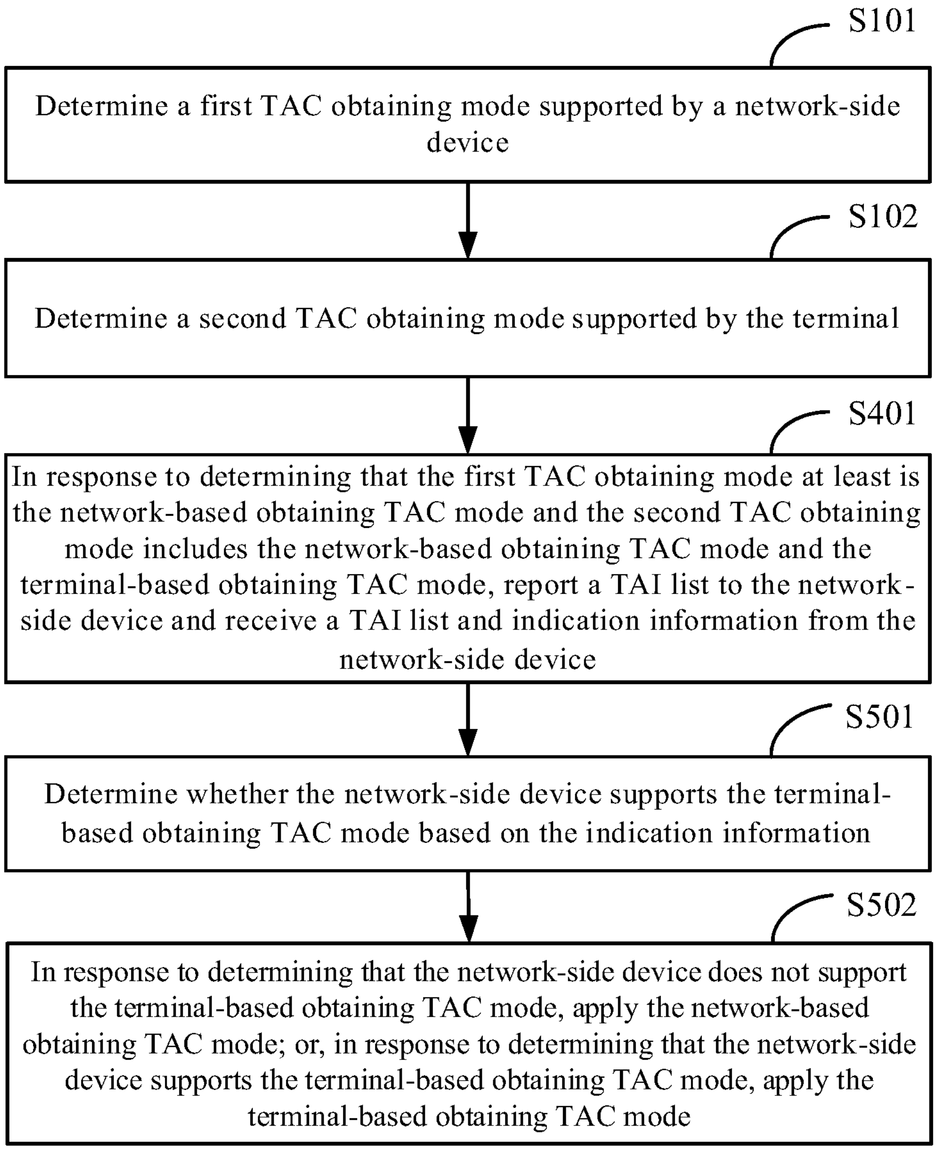
FIG. 5 is a schematic flowchart illustrating a method of determining a TAC obtaining mode according to still another embodiment of the present disclosure.

FIG. 5 is a schematic flowchart illustrating a method of determining a TAC obtaining mode according to still another embodiment of the present disclosure.

As shown in FIG. 5, based on the indication information, determining whether to obtain the target TAC by the network-based obtaining TAC mode or by the terminal-based obtaining TAC mode includes the following steps.

At step S501, whether the network-side device supports the terminal-based obtaining TAC mode is determined based on the indication information.

In an embodiment, the indication information may be carried in the registration accept message returned by the core network to the terminal. The terminal may receive the registration accept message to determine whether the network-side device supports the terminal-based obtaining TAC mode. In an embodiment, the network may indicate the supported first TAC obtaining mode by an explicit indication. For example, the network may carry two flags in a distributed message to respectively indicate whether the terminal-based obtaining TAC mode is supported and whether the network-based obtaining TAC mode is supported. For example, the value 0 of the flag indicates no supporting and the value 1 of the flag indicates supporting.

It should be noted that if the network broadcasts the TAC, it means that the network-based obtaining TAC mode is supported, and thus no additional indication may be made. For example, the indication information may be one flag used to indicate whether the network-side device supports terminal-based obtaining TAC mode or not.

In another embodiment, the network may indicate the supported first TAC obtaining mode by an implicit indication. For example, the network-side device may send a TAI list to the terminal, and then make explanation on the contents of the TAI list by the indication information. Thus, the terminal may, based on the contents, determine the first TAC obtaining mode supported by the network-side device.

For the network, the methods for configuring the TAI list usually include the following two methods: if the network-side device supports the terminal-based obtaining TAC mode, the geographical position of the terminal may be determined based on the TAI list reported by the terminal, and then, based on the geographical position, a TAI list is configured for the terminal; if the network-side device supports the network-based obtaining TAC mode and does not support the terminal-based obtaining TAC mode, the network may enable that the distributed TAI list only includes the TACs broadcast by the base station.

In an embodiment, the network may generate indication information based on the above two configuration methods. For example, the indication information may be a separate identifier unit including one or more flags; or the indication information may be included in the same identifier unit as the TAI list. For example, one or more flags are added to the TAI list. For example, the flag 00 indicates that the TAC in the TAI list configured by the network-side device is the TAC broadcast by the network, and thus the terminal may determine the network-side device does not support the terminal-based obtaining TAC mode; the flag 01 indicates the TAC in the TAI list configured by the network-side device is determined by the network-side device based on the TAI list reported by the terminal, and thus the terminal may determine the network-side device supports the terminal-based obtaining TAC mode.

In an embodiment, the network-side device may also not carry additional indication information, but enable the terminal to determine the configuration of the TAI list on its own so as to further determine whether the network-side device supports the terminal-based obtaining TAC mode or not.

Based on this, the terminal may also receive the TAI list configured by the network-side device.

In an embodiment, in response to determining that the indication information indicates the TAC in the received TAI list configured by the network-side device is the TAC broadcast by the network, it is determined that the network-side device does not support the terminal-based obtaining TAC mode.

If the network-side device supports the network-based obtaining TAC mode but does not support the terminal-based obtaining TAC mode, the network-side device may enable the distributed TAI list to only include the TAC broadcast by the base station. Further, the network-side device may, by the indication information, explain to the terminal that the TAC in the TAI list is the TAC broadcast by the base station. Based on this, after receiving the indication information, the terminal may determine whether the first TAC obtaining mode is the network-based obtaining TAC mode. Certainly, if the network-side device does not make an explanation by the additional indication information, the terminal may also make a determination on itself, namely, after determining the TAC in the TAI list is the TAC broadcast by the base station, determine the network-side device does not support the terminal-based obtaining TAC mode.

In an embodiment, in response to determining that the indication information indicates the TAC in the received TAI list configured by the network-side device is determined by the network-side device based on the TAI list reported by the terminal, it is determined that the first TAC obtaining mode includes the terminal-based obtaining TAC mode.

If the network-side device supports the terminal-based obtaining TAC mode, the network-side device determines a geographical position of the terminal based on the TAI list reported by the terminal and then, based on the geographical position, configures a TAI list for the terminal. Further, the network-side device may also, by the indication information, explain to the terminal that the TAI list is determined based on the geographical position of the terminal. In this way, after receiving the indication information, the terminal may determine whether the network-side device supports the terminal-based obtaining TAC mode. For example, the first TAC obtaining mode includes the terminal-based obtaining TAC mode and the network-based obtaining TAC mode. If the network does not make an explanation by the additional indication information, the terminal may also make a determination on its own, namely, after determining that the TAC in the TAI list is determined based on the geographical position of the terminal, the terminal may determine that the network-side device supports terminal-based obtaining TAC mode.

At step S502, in response to determining that the network-side device does not support the terminal-based obtaining TAC mode, the network-based obtaining TAC mode is applied; or, in response to determining that the network-side device supports the terminal-based obtaining TAC mode, the terminal-based obtaining TAC mode is applied.

In an embodiment, the terminal determines the network-side device does not support the terminal-based obtaining TAC mode, which means the terminal determines the first TAC obtaining mode is the network-based obtaining TAC mode. Thus, the terminal may obtain the target TAC by the network-based obtaining TAC mode.

Subsequently, the terminal may obtain the TAC based on the broadcast of the base station.

In an embodiment, the terminal determines the network-side device supports the terminal-based obtaining TAC mode, which means that the terminal determines the first TAC obtaining mode includes the terminal-based obtaining TAC mode. Thus, the terminal may obtain the target TAC by the terminal-based obtaining TAC mode.

Subsequently, the terminal may obtain the TAC based on the position information of the geographical position where the terminal is currently located, without obtaining TAC broadcast by the base station again.

Embodiment 3: The first TAC obtaining mode at least includes the network-based obtaining TAC mode, and the second TAC obtaining mode is the terminal-based obtaining TAC mode.

In an embodiment, in response to determining that the first TAC obtaining mode at least includes the network-based obtaining TAC mode and the second TAC obtaining mode is the terminal-based obtaining TAC mode, the target TAC is obtained by the terminal-based obtaining TAC mode.

Since the terminal only supports the terminal-based obtaining TAC mode, the terminal can only select the terminal-based obtaining TAC mode regardless of whether the network-side device supports the terminal-based obtaining TAC mode.

For example, the terminal may determine whether the network-side device supports the terminal-based obtaining TAC mode and then perform subsequent steps. Descriptions will be made below in combination with embodiments 3.1 to 3.2.

In an embodiment, in response to determining that the first TAC obtaining mode at least includes the network-based obtaining TAC mode and the second TAC obtaining mode is the terminal-based obtaining TAC mode, determining to obtain the target TAC by the terminal-based obtaining TAC mode includes:

reporting a TAI list to the network-side device and receiving a TAI list configured by the network-side device.

In an embodiment, the terminal may report a TAI list to the network-side device in a registration process. For example, report the TAI list by sending a registration request message carrying the TAI list.

In an embodiment, the terminal may firstly obtain the TAC by the terminal-based obtaining TAC mode, and report the obtained TAC to the network-side device through the TAI list. For example, the terminal may determine the position information of the terminal based on its own positioning and then based on a pre-stored correspondence between geographical area and TAC, determine at least one TAC corresponding to the position information and add a TAI corresponding to the TAC to the TAI list and then report the TAI list to the network-side device. For example, the terminal may carry the TAI list in the registration request message.

In an embodiment, the terminal may also send an indication information indicating that the terminal does not support the network-based obtaining TAC mode to the network-side device. For example, identification or the like may be made by one or more flags in the registration request message, which will not be repeated herein.

Embodiment 3.1: In response to determining that the TAI list sent by the network and the TAI list reported by the terminal are the same, the target TAC is obtained by the terminal-based obtaining TAC mode.

In an embodiment, the network-side device may, after receiving the indication information from the terminal, confirm that the terminal does not support the network-based obtaining TAC mode. Because the network-side device confirms that it does not support the terminal-based obtaining TAC mode, namely, the network-side device only supports the network-based obtaining TAC mode and the terminal only supports the terminal-based obtaining TAC mode, the network-side device may directly return to the terminal a TAI list that includes the same TAIs as reported by the terminal.

In an embodiment, the network-side device may send a TAI list to the terminal during a registration process of the terminal. For example, the network-side device may carry the TAI list in the registration accept message returned to the terminal.

In an embodiment, the terminal may receive the TAI list distributed by the network-side device. If the TAI list is the same as the TAI list reported by the terminal, the terminal may determine the network-side device does not support the terminal-based obtaining TAC mode.

Subsequently, the terminal may still obtain the target TAC by the terminal-based obtaining TAC mode. But the network-side device can determine a TA to which the terminal belongs based only on the TAI list reported by the terminal and cannot configure more TAIs for the terminal.

Embodiment 3.2: in response to determining that the TAI list sent by the network and the TAI list reported by the terminal are different, the indication information for indicating the network-side device supports terminal-based obtaining TAC mode is received from the network-side device, and the target TAC is obtained by terminal-based obtaining TAC mode.

In an embodiment, the network may, after receiving the indication information reported by the terminal, confirms the terminal does not support network-based obtaining TAC mode and then confirms the network itself supports terminal-based obtaining TAC mode, in other words, the network and the terminal both may apply the terminal-based obtaining TAC mode. Therefore, the network may obtain the TAC based on the TAI list reported by the terminal and query for the position information of the terminal based on the pre-stored correspondence between the geographical area and TAC, and further, the network-side device may configure a TAI list for the terminal based on the position information.

In an embodiment, the network-side device may send the TAI list and the indication information to the terminal in the registration process of the terminal. For example, the network-side device may carry the TAI list, and the indication information in the registration accept message returned to the terminal.

In an embodiment, the terminal may receive the TAI list configured by the network-side device. It can be understood that the TAI list is configured by the network based on the position information of the terminal and is usually different from the TAI list reported by the terminal.

For example, in some cases, the TAI list determined by the network-side device based on the position information of the terminal may also be the same as the TAI list reported by the terminal. Thus, the terminal may also make a further determination based on the indication information distributed by the network-side device.

In an embodiment, the network-side device may also distribute to the terminal indication information for indicating the network-side device supports terminal-based obtaining TAC mode. For example, the indication information may be an explicit indication to explicitly indicate the network supports terminal-based obtaining TAC mode. For example, identification can be made with one flag. Alternatively, the indication information may be an implicit indication to indicate. For example, the distributed TAI list is determined based on the position information of the terminal. The indication information herein may be a separate identifier unit, or may be included in an identifier unit of the TAI list, which is not limited herein.

In an embodiment, the terminal may, after receiving the indication information, determine the terminal and the network-side device both support terminal-based obtaining TAC mode.

Subsequently, the terminal may obtain the target TAC by terminal-based obtaining TAC mode, and the network-side device may, based on the TAI list reported by the terminal, determine the position information of the terminal and then based on the position information, configure a new TAI list for the terminal.

Embodiment 4: The first TAC obtaining mode only includes the terminal-based obtaining TAC mode, and the second TAC obtaining mode does not include the terminal-based obtaining TAC mode.

In an embodiment, in response to determining that the first TAC obtaining mode only includes the terminal-based obtaining TAC mode, and the second TAC obtaining mode does not include the terminal-based obtaining TAC mode, auxiliary information is sent to the network such that the network-side device is indicated to, at the time of paging the terminal, determine a cell where the terminal is located based on the auxiliary information.

In an embodiment, the terminal may, in response to not receiving the TAC broadcast by the network-side device, determine the first TAC obtaining mode supported by the network-side device only includes the terminal-based obtaining TAC mode. Therefore, the terminal cannot obtain the TAC when determining the terminal itself does not support the terminal-based obtaining TAC mode.

In an embodiment, a subsequent paging between the terminal and the network-side device can be achieved by the auxiliary information. The terminal may send the auxiliary information for indicating, for example, the network to know the position information of the terminal to the network-side device. Thus, the network may, at the time of paging the terminal, determine a cell where the terminal is located based on the auxiliary information, so as to determine which base stations can be used to page the terminal.

In an embodiment, the auxiliary information may include a position and a moving speed of the terminal. When the network-side device pages the terminal, the network-side device may, based on the auxiliary information sent by the terminal, estimate a position of the terminal and then send a paging to a base station corresponding to the position. In an embodiment, the auxiliary information may also include a moving direction and the like of the terminal, which helps the network-side device to, at the time of paging the terminal, estimate a cell where the terminal is located. In an embodiment, the auxiliary information may also include a type of the terminal and the like.

In this embodiment, the terminal may neither obtain the TAC based on terminal nor obtain the TAC based on network. The auxiliary information may assist the network in estimating the cell where the terminal is located at the time of paging the terminal, which effectively and simply solves the problem of the inability to know the tracking area of the terminal.

Embodiment 5: The first TAC obtaining mode only includes the terminal-based obtaining TAC mode, and the second TAC obtaining mode includes the terminal-based obtaining TAC mode.

In an embodiment, in response to determining that the first TAC obtaining mode only includes the terminal-based obtaining TAC mode, and the second TAC obtaining mode includes the terminal-based obtaining TAC mode, the target TAC is obtained by the terminal-based obtaining TAC mode.

In an embodiment, if failing to obtain a TAC from a system message broadcast by the base station, the terminal may determine the first TAC obtaining mode supported by the network-side device only includes the terminal-based obtaining TAC mode. When determining the terminal itself supports the terminal-based obtaining TAC mode, the terminal may obtain the target TAC by the terminal-based obtaining TAC mode.

In this embodiment, the terminal may directly determine to apply the terminal-based obtaining TAC mode without negotiation, reducing signaling interaction and saving performance.

Figure 6:
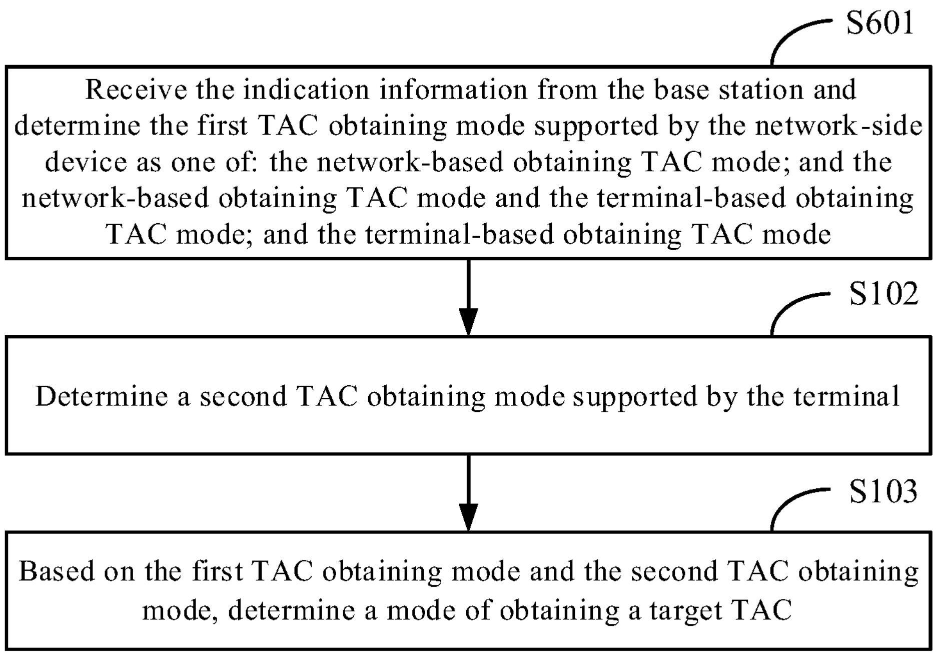
FIG. 6 is a schematic flowchart illustrating a method of determining a TAC obtaining mode according to still another embodiment of the present disclosure.

FIG. 6 is a schematic flowchart illustrating a method of determining another TAC obtaining mode according to still another embodiment of the present disclosure.

As shown in FIG. 6, determining the first TAC obtaining mode supported by the network-side device may include the following step.

At step S601, the indication information is received from the base station and the first TAC obtaining mode supported by the network-side device is determined as one of: the network-based obtaining TAC mode; and the network-based obtaining TAC mode and the terminal-based obtaining TAC mode; and the terminal-based obtaining TAC mode.

In an embodiment, the network-side device may, by distributing the indication information, notify the terminal of the first TAC obtaining mode supported by the network-side device.

In an embodiment, the indication information may be a system message broadcast by the base station. For example, a field of the indication information is added to the existing system message or a new system message carrying the indication information is added.

For example, the indication information may include two flags, one of which is used to indicate whether the network supports the network-based obtaining TAC mode, and the other is used to indicate whether the network supports the terminal-based obtaining TAC mode. Alternatively, the flag 0 is used to indicate no supporting and the flag 1 is used to indicate supporting.

In an embodiment, the network-side device may distribute three different types of indication information which are respectively used to indicate that: the network-side device only supports the network-based obtaining TAC mode; the network-side device supports both the network-based obtaining TAC mode and the terminal-based obtaining TAC mode; and the network-side device only supports the terminal-based obtaining TAC mode.

In an embodiment, the terminal may receive indication information from the base station and based on the indication information, determine the first TAC obtaining mode supported by the network-side device. For example, the terminal may perform a determination based on a flag in the indication information. For example, the first TAC obtaining mode may be determined as one of: the network-based obtaining TAC mode, the network-based obtaining TAC mode and the terminal-based obtaining TAC mode, and the terminal-based obtaining TAC mode.

In an embodiment, the terminal may, after receiving the indication information and determining the first TAC obtaining mode supported by the network-side device, also determine a mode of obtaining the target TAC. Descriptions will be made below in combination with embodiments 6 to 7.

Embodiment 6: The network-side device only supports one TAC obtaining mode.

In an embodiment, in response to determining that the first TAC obtaining mode only comprises the terminal-based obtaining TAC mode or the network-based obtaining TAC mode, it is determined that the target TAC is obtained based on the first TAC obtaining mode.

In an embodiment, the terminal may determine the first TAC obtaining mode supported by the network-side device based on the indication information sent by the base station.

If the network-side device only supports the terminal-based obtaining TAC mode, the target TAC is obtained by the terminal-based obtaining TAC mode.

If the network-side device only supports the network-based obtaining TAC mode, the target TAC is obtained by the network-based obtaining TAC mode.

In this embodiment, the terminal may obtain the target TAC by directly using the mode supported by the network-side device, speeding up selection, avoiding multiple signaling interactions and saving performance.

Embodiment 7: The network-side device supports two TAC obtaining modes.

In an embodiment, in response to determining that the first TAC obtaining mode includes the network-based obtaining TAC mode and the terminal-based obtaining TAC mode, the target TAC is obtained based on the second TAC obtaining mode.

In an embodiment, the terminal may, based on the indication information sent by the base station, determine the first TAC obtaining mode supported by the network-side device.

If the network-side device supports both the network-based obtaining TAC mode and the terminal-based obtaining TAC mode, the terminal may obtain the target TAC based on the second TAC obtaining mode supported by the terminal itself.

In an embodiment, in response to determining that the second TAC obtaining mode only includes the terminal-based obtaining TAC mode or the network-based obtaining TAC mode, it is determined that the target TAC is obtained based on the second TAC obtaining mode.

If the terminal only supports one obtaining mode, the terminal may determine to obtain the target TAC based on the mode supported by itself.

For example, if the terminal only supports the terminal-based obtaining TAC mode, it is determined that the target TAC is obtained by the terminal-based obtaining TAC mode.

If the terminal only supports the network-based obtaining TAC mode, it is determined that the target TAC is obtained by the network-based obtaining TAC mode.

In an embodiment, in response to determining that the second TAC obtaining mode includes the terminal-based obtaining TAC mode and the network-based obtaining TAC mode, the target TAC is obtained by using any one of the terminal-based obtaining TAC mode and the network-based obtaining TAC mode.

If the terminal supports both the network-based obtaining TAC mode and the terminal-based obtaining TAC mode, the terminal may determine to obtain the target TAC by using any one of the terminal-based obtaining TAC mode and the network-based obtaining TAC mode. For example, the terminal may determine to obtain the target TAC by the terminal-based obtaining TAC mode. Alternatively, the terminal may also determine to obtain the target TAC by the network-based obtaining TAC mode.

In this embodiment, the terminal may make selections based on actual situations. For example, in order to save performance, the terminal may obtain the target TAC by the terminal-based obtaining TAC mode, without receiving the TAC broadcast by the base station. Alternatively, when the current positioning is inaccurate, it is possible that accurate position information cannot be obtained. Thus, the target TAC can be obtained by the network-based obtaining TAC mode.

Figure 7:
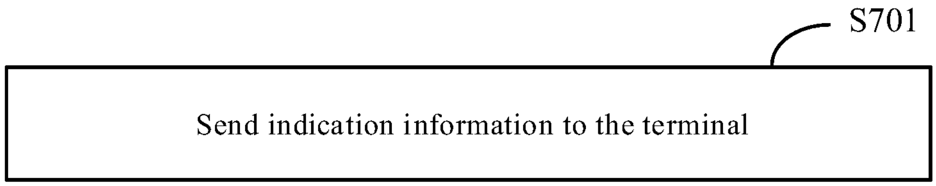
FIG. 7 is a schematic flowchart illustrating a method of determining a TAC obtaining mode according to still another embodiment of the present disclosure.

FIG. 7 is a schematic flowchart illustrating a method of determining a TAC obtaining mode according to still another embodiment of the present disclosure. The method of determining a TAC obtaining mode in this embodiment is applied to a network-side device. The network-side device may be one of a base station and/or a core network. The base station may include, but is not limited to, a 4G base station, a 5G base station and a 6G base station. The core network may include, but is not limited to, a 4G core network, a 5G core network, and a 6G core network. The network-side device may serve as a user device to communicate with a terminal. The terminal may include, but is not limited, to a smartphone, a tablet computer, a wearable device, a sensor, an internet-of-things device, or other electronic devices. In an embodiment, the terminal may be the terminal applied in the method of determining a TAC obtaining mode mentioned in any one of the above embodiments.

As shown in FIG. 7, the method of determining a TAC obtaining mode may include the following step.

At step S701, indication information is sent to the terminal.

The indication information is used to indicate the first TAC obtaining mode supported by the network-side device, such that the terminal can determine a mode of obtaining a target TAC.

For example, the network-side device may include a core network and/or a base station. The base station may perform operations such as system message broadcast. The core network may obtain and configure TAI and perform interactions with the terminal for registration and the like. The interactions between the core network and the terminal require the base station to forward relevant information, and thus the core network and the base station are collectively called network-side device and will not be explained below. The first TAC obtaining mode supported by the network-side device is a mode supported by both the base station and the core network.

In an embodiment, the terminal may, when determining the first TAC obtaining mode, determine it based on the indication information sent by the network-side device. Further, the terminal may determine a mode of obtaining a target TAC in combination with the second TAC obtaining mode supported by itself.

In an embodiment, the first TAC obtaining mode may include at least one of: a network-based obtaining TAC mode or a terminal-based obtaining TAC mode.

In an embodiment, the network-side device may directly broadcast the indication information to indicate to the terminal the first TAC obtaining mode supported by the network-side device. Alternatively, the network-side device may not broadcast the indication information and the terminal may, based on whether a broadcast TAC is received, determine the first TAC obtaining mode supported by the network-side device. Descriptions are made below in combination with embodiments 8 and 9.

Embodiment 8: The network-side device broadcasts the indication information.

In an embodiment, sending the indication information to the terminal includes: broadcasting the indication information to the terminal by the base station.

In this embodiment, the base station may directly send the indication information to the terminal to indicate the first TAC obtaining mode supported by the network-side device. For example, the base station may carry the indication information in the broadcast system message.

In an embodiment, the indication information may include one of that:

- the first TAC obtaining mode includes the network-based obtaining TAC mode;
- the first TAC obtaining mode includes the network-based obtaining TAC mode and the terminal-based obtaining TAC mode; and
- the first TAC obtaining mode includes the terminal-based obtaining TAC mode.

In an embodiment, the indication information may be a system message broadcast by the base station. For example, a field of the indication information is added to the existing system message or a new system message is added to carry the indication information. For example, the indication information may include two flags, one of which is used to indicate whether the network supports the network-based obtaining TAC mode, and the other is used to indicate whether the network supports the terminal-based obtaining TAC mode. Alternatively, the flag 0 is used to indicate no support and the flag 1 is used to indicate support.

Thus, the terminal may determine a mode of obtaining the target TAC based on the first TAC obtaining mode supported by the network-side device in combination with the second TAC obtaining mode supported by the terminal.

In an embodiment, when the network-side device only supports one TAC obtaining mode, the terminal may determine to obtain the target TAC based on the first TAC obtaining mode.

For example, if the first TAC obtaining mode supported by the network-side device is the network-based obtaining TAC mode, the terminal determines to obtain the target TAC by the network-based obtaining TAC mode. If the first TAC obtaining mode supported by the network-side device is the terminal-based obtaining TAC mode, the terminal determines to obtain the target TAC by the terminal-based obtaining TAC mode.

In an embodiment, when the network-side device supports two TAC obtaining modes (i.e., the first TAC obtaining mode supported by the network-side device is the network-based obtaining TAC mode and the terminal-based obtaining TAC mode), the terminal may obtain the target TAC based on the second TAC obtaining mode supported by the terminal.

For example, if the terminal only supports the terminal-based obtaining TAC mode, it is determined to obtain the target TAC by the terminal-based obtaining TAC mode; if the terminal only supports the network-based obtaining TAC mode, it is determined to obtain the target TAC by the network-based obtaining TAC mode; if the terminal supports both the network-based obtaining TAC mode and the terminal-based obtaining TAC mode, the terminal may determine to obtain the target TAC by using any one of the terminal-based obtaining TAC mode and the network-based obtaining TAC mode.

In this embodiment, the network-side device may enable the terminals to select an appropriate TAC obtaining mode independently, so as to improve compatibility for different terminals.

Embodiment 9: The network does not broadcast the indication information.

In an embodiment, when the network-side device supports the network-based obtaining TAC mode, the network-side device broadcasts TAC through the base station. Thus, the terminal may determine the network at least supports the network-based obtaining TAC mode. Further, if the terminal selects the terminal-based obtaining TAC mode, the terminal needs to further confirm with the network the first TAC obtaining mode supported by the network-side device. For example, the terminal may make further determinations through a registration process. Descriptions will be made below in detail.

In an embodiment, sending the indication information to the terminal may include: in a registration process of the terminal, sending the indication information to the terminal.

For example, the core network may send the indication information to the terminal during a registration process of the terminal to indicate the first TAC obtaining mode supported by the network-side device. For example, the first TAC obtaining mode may include one of: the network-based obtaining TAC mode; the network-based obtaining TAC mode and the terminal-based obtaining TAC mode; the terminal-based obtaining TAC mode.

In an embodiment, sending the indication information to the terminal includes: determining the second TAC obtaining mode supported by the terminal; sending the indication information to the terminal based on the second TAC obtaining mode.

In an embodiment, determining the second TAC obtaining mode supported by the terminal includes: in response to determining that the terminal reports a TAI list, determining the second TAC obtaining mode includes the terminal-based obtaining TAC mode.

In an embodiment, the terminal may report the TAI list in a registration process.

It is noted that, if selecting the terminal-based obtaining TAC mode, the terminal may first obtain the TAC by the terminal-based obtaining TAC mode. Firstly, the terminal may determine position information based on its own positioning, and then, based on a pre-stored correspondence between geographical area and TAC, determine one or more TACs corresponding to the position information. Further, the terminal may add a TAI corresponding to the TAC into the TAI list and send the TAI list to the network-side device.

For example, the terminal may carry the TAI list in the registration request message.

Thus, the network-side device may, after receiving the TAI list reported by the terminal, determine the second TAC obtaining mode supported by the terminal at least includes the terminal-based obtaining TAC mode and the terminal selects the terminal-based obtaining TAC mode.

In an embodiment, the terminal may also, by an indication information, further indicate the second TAC obtaining mode supported by the terminal.

Therefore, the network-side device determines the second TAC obtaining mode supported by the terminal, which further includes: receiving terminal indication information from the terminal; based on the terminal indication information, determining the second TAC obtaining mode includes one of: the terminal-based obtaining TAC mode, and the terminal-based obtaining TAC mode and the network-based obtaining TAC mode.

For example, the terminal may report the second TAC obtaining mode supported by the terminal itself through the above indication information in a registration process. The network-side device, after receiving the information, sends to the terminal indication information for indicating the first TAC obtaining mode supported by the network-side device.

For example, the terminal may carry the TAI list and/or the message for indicating the second TAC obtaining mode supported by the terminal in the registration request message. After receiving the TAI list and/or message reported by the terminal, the network-side device may determine the second TAC obtaining mode supported by the terminal, and then send the indication information to the terminal based on the second TAC obtaining mode.

For example, if the network-side device receives the TAI list reported by the terminal and the terminal indicates not supporting the network-based obtaining TAC mode, the network-side device may determine the second TAC obtaining mode supported by the terminal is the terminal-based obtaining TAC mode; if the network-side device receives the TAI list reported by the terminal and the terminal indicates supporting the network-based obtaining TAC mode, the network-side device may determine the second TAC obtaining mode supported by the terminal is the terminal-based obtaining TAC mode and the network-based obtaining TAC mode.

For example, when the second TAC obtaining modes are different, the indication information sent by the network may also be different. Descriptions will be made below in combination with embodiments 9.1 to 9.2.

Embodiment 9.1: The second TAC obtaining mode is the terminal-based obtaining TAC mode and the network-based obtaining TAC mode.

It is noted that, based on different first TAC obtaining modes supported by the network-side device, there may be two cases: in a first case, the first TAC obtaining mode is the network-based obtaining TAC mode (i.e., the network only supports the network-based obtaining TAC mode and does not support the terminal-based obtaining TAC mode); in a second case, the first TAC obtaining mode is the network-based obtaining TAC mode and the terminal-based obtaining TAC mode. Descriptions are made below respectively.

The first case: The first TAC obtaining mode is the network-based obtaining TAC mode.

Sending the indication information to the terminal based on the second TAC obtaining mode includes: in response to determining that the first TAC obtaining mode is the network-based obtaining TAC mode, and the second TAC obtaining mode includes the network-based obtaining TAC mode, indicating, by the indication information, the network-side device does not supports the terminal-based obtaining TAC mode, such that the terminal determines to obtain the target TAC by the network-based obtaining TAC mode.

When the network-side device determines the terminal supports the network-based obtaining TAC mode and the terminal-based obtaining TAC mode, if the network itself does not support the terminal-based obtaining TAC mode, the network may indicate to the terminal by the indication information that the network only supports the network-based obtaining TAC mode (the first TAC obtaining mode is the network-based obtaining TAC mode). Thus, after receiving the indication information, the terminal may perform selection again to determine to obtain the target TAC by the network-based obtaining TAC mode.

In an embodiment, the indication information sent by the network-side device to the terminal may be an explicit indication to clearly indicate to the terminal the mode supported by the network-side device. For example, the indication may be made by a flag; for example, the value 0 of the flag may represent not supporting the terminal-based obtaining TAC mode.

For example, by broadcasting TAC, the network shows it supports the network-based obtaining TAC mode. Therefore, the network does not need to indicate, by additional indication, supporting the network-based obtaining TAC mode.

In an embodiment, the indication information sent by the network to the terminal may be an implicit indication. For example, the network may send a TAI list to the terminal, and the indication information indicates the TAC in the TAI list is the TAC broadcast by the network-side device such that the terminal, based on the indication information, determines that the first TAC obtaining mode is the network-based obtaining TAC mode.

The network-side device may, by the indication information, notify to the terminal that the TAC in the TAI list is the TAC broadcast by the base station. As a result, after receiving the indication information, the terminal may determine the network-side device does not support the terminal-based obtaining TAC mode, that is, the first TAC obtaining mode is the network-based obtaining TAC mode. Since the terminal supports the network-based obtaining TAC mode, the terminal may obtain the target TAC by the network-based obtaining TAC mode.

The second case: The first TAC obtaining mode is the network-based obtaining TAC mode and the terminal-based obtaining TAC mode.

Sending the indication information to the terminal based on the second TAC obtaining mode may include:

in response to determining that the first TAC obtaining mode includes the terminal-based obtaining TAC mode, indicating, by the indication information, the network-side device supports the terminal-based obtaining TAC mode, such that the terminal determines to obtain the target TAC by the terminal-based obtaining TAC mode.

After the network determines the terminal selects the terminal-based obtaining TAC mode, when the network itself also supports the terminal-based obtaining TAC mode (i.e., the first TAC obtaining mode includes the terminal-based obtaining TAC mode), the network notifies the terminal by the indication information that the network-side device supports the terminal-based obtaining TAC mode. Thus, after receiving the indication information, the terminal determines to obtain the target TAC by the terminal-based obtaining TAC mode.

In an embodiment, if the network-side device supports the terminal-based obtaining TAC mode, the network-side device determines the geographical position of the terminal based on the TAI list reported by the terminal and then based on the geographical position, configures a TAI list for the terminal.

In an embodiment, the indication information sent by the network-side device to the terminal may be an explicit indication to clearly indicate to the terminal the mode supported by the network-side device. For example, the indication may be made by a flag, for example, the value 1 of the flag may represent supporting the terminal-based obtaining TAC mode.

In an embodiment, the indication information sent by the network-side device to the terminal may be an implicit indication. For example, the network-side device may send a TAI list to the terminal, and the indication information indicates the TAC in the TAI list is determined by the network-side device based on the position information of the terminal such that the terminal determines, based on the indication information, that the first TAC obtaining mode includes the terminal-based obtaining TAC mode.

The network-side device may, after receiving a TAI list from the terminal, obtain a TAC based on the TAI list reported by the terminal, and query for the position information of the terminal based on a pre-stored correspondence between geographical area and TAC. Further, the network may configure a TAI list for the terminal based on the position information.

The network-side device may notify the terminal by the indication information that the TAC in the TAI list is determined by the network based on the position information of the terminal. After receiving the indication information, the terminal may determine that the network supports that the terminal obtains the target TAC by the terminal-based obtaining TAC mode.

Till now, descriptions of the two cases of the embodiment 9.1 are completed.

Embodiment 9.2: The second TAC obtaining mode is the terminal-based obtaining TAC mode.

For example based on different first TAC obtaining modes supported by the network-side device, there may also be two cases: in a first case, the first TAC obtaining mode is the network-based obtaining TAC mode (i.e., the network only supports the network-based obtaining TAC mode and does not support the terminal-based obtaining TAC mode); in a second case, the first TAC obtaining mode is the network-based obtaining TAC mode and the terminal-based obtaining TAC mode. Descriptions are made below respectively.

The first case: The first TAC obtaining mode is the network-based obtaining TAC mode.

Sending the indication information to the terminal based on the second TAC obtaining mode includes:

in response to determining that the first TAC obtaining mode is the network-based obtaining TAC mode, indicating, by the indication information, that the network-side device does not support the terminal-based obtaining TAC mode such that the terminal determines to obtain the target TAC by the terminal-based obtaining TAC mode.

When the network-side device determines the terminal only supports the terminal-based obtaining TAC mode, if the network itself does not support the terminal-based obtaining TAC mode, the network-side device indicates to the terminal by the indication information that the network-side device only supports the network-based obtaining TAC mode (i.e., the first TAC obtaining mode is the network-based obtaining TAC mode). Thus, the terminal, after receiving the indication information, determines to apply the terminal-based obtaining TAC mode.

In an embodiment, the indication information sent by the network-side device to the terminal may be an explicit indication to clearly indicate to the terminal the mode supported by the network-side device. For example, the indication may be made by a flag. For example, the value 0 of the flag may represent not supporting the terminal-based obtaining TAC mode.

For example, by broadcasting TAC, the network-side device shows it supports the network-based obtaining TAC mode. Therefore, the network does not need to indicate, by additional indication, supporting the network-based obtaining TAC mode.

In an embodiment, the indication information sent by the network-side device to the terminal may be an implicit indication. For example, the network-side device may send a TAI list to the terminal, and the indication information indicates the TAI list is the TAI list reported by the terminal such that the terminal, based on the indication information, determines that the first TAC obtaining mode is the network-based obtaining TAC mode.

After the network-side device receives the TAI list reported by the terminal, since the network-side device does not support the terminal-based obtaining TAC mode, the network-side device cannot analyze the position of the terminal. Therefore, the network-side device directly returns the TAI list reported by the terminal to the terminal.

The network-side device may notify the terminal by the indication information that the TAI list is the TAI list reported by the terminal. After receiving the indication information, the terminal may determine the network-side device does not support the terminal-based obtaining TAC mode. For example, the first TAC obtaining mode is the network-based obtaining TAC mode. Hence, the terminal obtains the target TAC by the network-based obtaining TAC mode.

The second case: The first TAC obtaining mode is the network-based obtaining TAC mode and the terminal-based obtaining TAC mode.

When the terminal selects the terminal-based obtaining TAC mode, if the network-side device supports the terminal-based obtaining TAC mode, the network may directly indicate to the terminal that the network-side device supports the terminal-based obtaining TAC mode and enable the terminal to apply the terminal-based obtaining TAC mode. The specific implementation may be referred to the second case in 9.1 and will not be repeated herein.

For example the above embodiments 8 to 9 only illustratively show that the terminal selects the terminal-based obtaining TAC mode. During implementation, the terminal may also select the network-based obtaining TAC mode. Thus, the terminal may directly make selection based on its own situation without reporting to the network-side device. The specific implementation may be referred to the relevant embodiments of the terminal side and will not be repeated herein.

For example when the network-side device does not support the network-based obtaining TAC mode, the network-side device will not broadcast TAC through the base station, and the terminal may thus determine the network-side device only supports the terminal-based obtaining TAC mode and does not support the network-based obtaining TAC mode. Furthermore, if the terminal supports the terminal-based obtaining TAC mode, it can apply the terminal-based obtaining TAC mode. If the terminal does not support the terminal-based obtaining TAC mode, it can send auxiliary information to the network-side device to indicate the network-side device to, at the time of paging the terminal, determine a cell where the terminal is located based on the auxiliary information. The specific implementation of the auxiliary information may be referred to the relevant embodiments of the terminal side and will not be repeated herein.

As in the flow shown in FIG. 7, the network-side device may indicate a TAC obtaining mode supported by the network-side device by sending an indication information to the terminal, such that the terminal can make flexible selections. Thus, the network-side device can adapt to multiple types of terminals, improving the compatibility with the terminals.

Corresponding to the above embodiments of the method of determining a tracking area code (TAC) obtaining mode, the present disclosure further provides an embodiment of an apparatus for determining a TAC obtaining mode.

Figure 8:
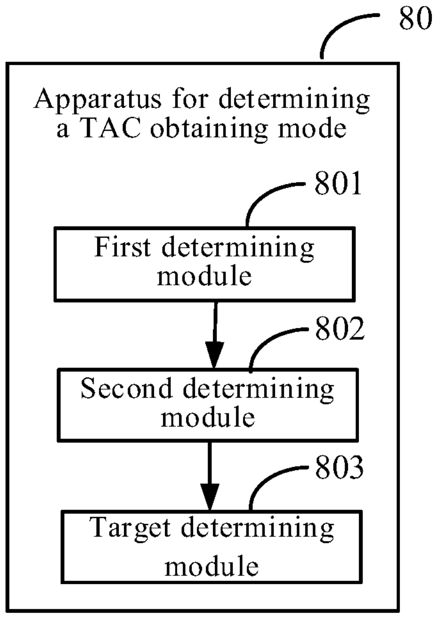
FIG. 8 is a schematic block diagram illustrating an apparatus for determining a TAC obtaining mode according to an embodiment of the present disclosure.

FIG. 8 is a schematic block diagram illustrating an apparatus 80 for determining a TAC obtaining mode according to an embodiment of the present disclosure.

As shown in FIG. 8, the apparatus 80 includes:

a first determining module 801, configured to determine a first TAC obtaining mode supported by a network-side device;

a second determining module 802, configured to determine a second TAC obtaining mode supported by the terminal; and a target determining module 803, configured to, based on the first TAC obtaining mode and the second TAC obtaining mode, determine a mode of obtaining a target TAC.

In an embodiment, the first TAC obtaining mode and the second TAC obtaining mode include at least one of: the network-based obtaining TAC mode or the terminal-based obtaining TAC mode.

In an embodiment, the first determining module 801 is specifically configured to:

in response to receiving a TAC broadcast by a base station, determine the first TAC obtaining mode supported by the network-side device at least includes the network-based obtaining TAC mode; in response to not receiving a TAC broadcast by the base station, determine the first TAC obtaining mode supported by the network-side device only is the terminal-based obtaining TAC mode.

In an embodiment, the target determining module 803 is specifically configured to:

in response to determining that the first TAC obtaining mode at least includes the network-based obtaining TAC mode and the second TAC obtaining mode is the network-based obtaining TAC mode, determine to obtain the target TAC by the network-based obtaining TAC mode;

in response to determining that the first TAC obtaining mode at least includes the network-based obtaining TAC mode and the second TAC obtaining mode includes the network-based obtaining TAC mode and the terminal-based obtaining TAC mode, determine to obtain the target TAC by the network-based obtaining TAC mode or by the terminal-based obtaining TAC mode;

in response to determining that the first TAC obtaining mode at least includes the network-based obtaining TAC mode and the second TAC obtaining mode is the terminal-based obtaining TAC mode, determine to obtain the target TAC by the terminal-based obtaining TAC mode.

In an embodiment, in response to determining that the first TAC obtaining mode at least includes the network-based obtaining TAC mode and the second TAC obtaining mode includes the network-based obtaining TAC mode and the terminal-based obtaining TAC mode, determining to obtain the target TAC by the network-based obtaining TAC mode or by the terminal-based obtaining TAC mode includes:

obtaining the target TAC by the network-based obtaining TAC mode.

In an embodiment, in response to determining that the first TAC obtaining mode at least includes the network-based obtaining TAC mode and the second TAC obtaining mode includes the network-based obtaining TAC mode and the terminal-based obtaining TAC mode, determining to obtain the target TAC by the network-based obtaining TAC mode or by the terminal-based obtaining TAC mode includes: reporting a TAI list to the network-side device and receiving a TAI list and indication information from the network-side device; and according to the indication information, determining to obtain the target TAC by the network-based obtaining TAC mode or by the terminal-based obtaining TAC mode.

In an embodiment, according to the indication information, determining to obtain the target TAC by the network-based obtaining TAC mode or by the terminal-based obtaining TAC mode includes:

according to the indication information, determining whether the network-side device supports the terminal-based obtaining TAC mode; and in response to determining that the network-side device does not support the terminal-based obtaining TAC mode, applying the network-based obtaining TAC mode; or, in response to determining that the network-side device supports the terminal-based obtaining TAC mode, applying the terminal-based obtaining TAC mode.

In an embodiment, according to the indication information, determining whether the network-side device supports the terminal-based obtaining TAC mode includes:

in response to determining that the indication information indicates that the TAC in the received TAI list configured by the network-side device is a network-broadcast TAC, determining the network-side device does not support the terminal-based obtaining TAC mode;

in response to determining that the indication information indicates that the TAC in the received TAI list configured by the network-side device is determined by the network-side device based on the TAI list reported by the terminal, determining the network-side device supports the terminal-based obtaining TAC mode.

In an embodiment, in response to determining that the first TAC obtaining mode at least includes the network-based obtaining TAC mode and the second TAC obtaining mode is the terminal-based obtaining TAC mode, determining to obtain the target TAC by the terminal-based obtaining TAC mode includes:

reporting a TAI list to the network-side device; receiving a TAI list configured by the network-side device; and in response to determining that the TAI list received from the network-side device and the TAI list reported by the terminal are same, obtaining the target TAC by the terminal-based obtaining TAC mode.

In an embodiment, in response to determining that the TAI list received from the network-side device and the TAI list reported by the terminal are different, the indication information for indicating that the network-side device supports the terminal-based obtaining TAC mode is received from the network-side device, and the target TAC is obtained by the terminal-based obtaining TAC mode.

In an embodiment, the first determining module 801 is further configured to: in response to determining that the first TAC obtaining mode only is the terminal-based obtaining TAC mode, and the second TAC obtaining mode does not include the terminal-based obtaining TAC mode, send to the network-side device auxiliary information for indicating the network-side device to, at the time of paging the terminal, determine a cell where the terminal is located based on the auxiliary information;

in response to determining that the first TAC obtaining mode only is the terminal-based obtaining TAC mode and the second TAC obtaining mode includes the terminal-based obtaining TAC mode, obtain the target TAC by the terminal-based obtaining TAC mode.

In an embodiment, the auxiliary information includes a position and a moving speed of the terminal.

In an embodiment, the first determining module 801 is specifically configured to:

receive indication information from a base station, and determine the first TAC obtaining mode supported by the network-side device as one of: the network-based obtaining TAC mode; the network-based obtaining TAC mode and the terminal-based obtaining TAC mode; the terminal-based obtaining TAC mode.

In an embodiment, the target determining module 803 is specifically configured to:

in response to determining that the first TAC obtaining mode only is the terminal-based obtaining TAC mode or the network-based obtaining TAC mode, determine to obtain the target TAC by using the first TAC obtaining mode; in response to determining that the first TAC obtaining mode is the network-based obtaining TAC mode and the terminal-based obtaining TAC mode, obtain the target TAC by the second TAC obtaining mode.

In an embodiment, obtaining the target TAC by the target determining module 803 based on the second TAC obtaining mode includes:

in response to determining that the second TAC obtaining mode only is the terminal-based obtaining TAC mode or the network-based obtaining TAC mode, determining to obtain the target TAC by using the second TAC obtaining mode; in response to determining that the second TAC obtaining mode is the terminal-based obtaining TAC mode and the network-based obtaining TAC mode, obtaining the target TAC by using any one of the terminal-based obtaining TAC mode and the network-based obtaining TAC mode.

Corresponding to the above embodiments of the method of determining a tracking area code (TAC) obtaining mode, the present disclosure further provides an embodiment of an apparatus for determining a TAC obtaining mode. The apparatus for determining a TAC obtaining mode in this embodiment is applied to the network-side device. The network-side device may be one of a base station and/or a core network. The base station may include but not limited to a 4G base station, a 5G base station and a 6G base station. The core network may include but not limited to a 4G core network, a 5G core network, and a 6G core network. The network-side device may serve as a user device to communicate with a terminal. The terminal may include but not limited to a smart phone, a tablet computer, a wearable device, a sensor and an internet-of-things device and other electronic devices. In an embodiment, the terminal may be the terminal applied in the apparatus for determining a TAC obtaining mode mentioned in any one of the above embodiments.

Figure 9:
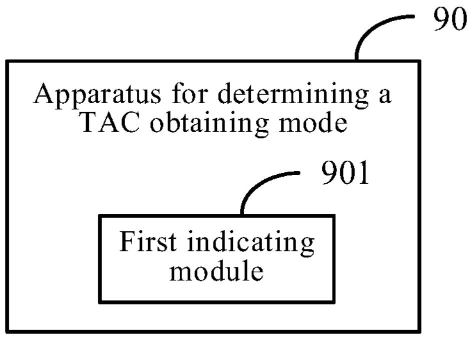
FIG. 9 is a schematic block diagram illustrating an apparatus for determining a TAC obtaining mode according to another embodiment of the present disclosure.

FIG. 9 is a schematic block diagram illustrating an apparatus 90 for determining a TAC obtaining mode according to another embodiment of the present disclosure.

As shown in FIG. 9, the apparatus 90 includes:

a first indicating module 901, configured to send indication information to a terminal, where the indication information is used to indicate a first TAC obtaining mode supported by the network-side device such that the terminal determines a mode of obtaining a target TAC based on the indication information.

In an embodiment, the first TAC obtaining mode includes at least one of: the network-based obtaining TAC mode and the terminal-based obtaining TAC mode.

In an embodiment, sending the indication information to the terminal includes: in a registration process of the terminal, sending the indication information to the terminal.

In an embodiment, sending the indication information to the terminal includes: determining a second TAC obtaining mode supported by the terminal; based on the second TAC obtaining mode, sending the indication information to the terminal.

In an embodiment, determining the second TAC obtaining mode supported by the terminal includes:

in response to determining that the terminal reports a TAI list, determining the second TAC obtaining mode includes the terminal-based obtaining TAC mode.

In an embodiment, the first indicating module 901 is further configured to: receive terminal indication information from the terminal; and based on the terminal indication information, determine the second TAC obtaining mode includes one of: the terminal-based obtaining TAC mode; the terminal-based obtaining TAC mode and the network-based obtaining TAC mode.

In an embodiment, in response to determining that the second TAC obtaining mode includes the terminal-based obtaining TAC mode, sending the indication information to the terminal based on the second TAC obtaining mode includes: in response to determining that the first TAC obtaining mode is a network-based obtaining TAC mode, and the second TAC obtaining mode includes the network-based obtaining TAC mode, indicating, by the indication information, the network-side device does not support the terminal-based obtaining TAC mode such that the terminal determines to obtain the target TAC by the network-based obtaining TAC mode.

In an embodiment, the first indicating module 901 is further configured to: send a TAI list to the terminal, where the indication information indicates a TAC in the TAI list is a network-broadcast TAC, such that the terminal determines, based on the indication information, that the network-side device does not support the terminal-based obtaining TAC mode.

In an embodiment, in response to determining that the second TAC obtaining mode includes the terminal-based obtaining TAC mode, sending the indication information to the terminal based on the second TAC obtaining mode includes:

in response to the first TAC obtaining mode includes the terminal-based obtaining TAC mode, indicating, by the indication information, that the network-side device supports the terminal-based obtaining TAC mode, such that the terminal determines to obtain the target TAC by the terminal-based obtaining TAC mode.

In an embodiment, the first indicating module 901 is further configured to: send a TAI list to the terminal, where the indication information indicates a TAC in the TAI list is determined by the network based on position information of the terminal, such that the terminal determines, based on the indication information, that the network-side device supports the terminal-based obtaining TAC mode.

In an embodiment, in response to determining that the second TAC obtaining mode is the terminal-based obtaining TAC mode, sending the indication information to the terminal based on the second TAC obtaining mode includes:

in response to determining that the first TAC obtaining mode is the network-based obtaining TAC mode, indicating, by the indication information, that the network-side device does not support the terminal-based obtaining TAC mode, such that the terminal determines to obtain the target TAC by the terminal-based obtaining TAC mode.

In an embodiment, the first indicating module 901 is further configured to: send a TAI list to the terminal, where the indication information indicates the TAI list is the TAI list reported by the terminal, such that the terminal determines, based on the indication information, that the network-side device does not support the terminal-based obtaining TAC mode.

In an embodiment, sending the indication information to the terminal includes: broadcasting the indication information to the terminal through a base station.

In an embodiment, the indication information includes one of: the first TAC obtaining mode is the network-based obtaining TAC mode; the first TAC obtaining mode is the network-based obtaining TAC mode and the terminal-based obtaining TAC mode; the first TAC obtaining mode is the terminal-based obtaining TAC mode.

The specific mode in which each module in the apparatus in the above embodiments performs operations has been detailed in the method embodiments and will not be repeated herein.

Since the apparatus embodiments substantially correspond to the method embodiments, a reference may be made to part of the descriptions of the method embodiments for the related part. The apparatus embodiments described above are merely illustrative, where the units described as separate members may be or not be physically separated, and the members displayed as modules may be or not be physical modules, e.g., may be located in one place, or may be distributed to a plurality of network modules. Part or all of the modules may be selected according to actual requirements to implement the objectives of the solutions in the embodiments. Those of ordinary skill in the art may understand and carry out them without creative work.

An embodiment of the present disclosure further provides an electronic device, including a processor; and a memory storing instructions executable by the processor;

where the processor is configured to perform the above method of determining a TAC obtaining mode.

An embodiment of the present disclosure further provides a computer-readable storage medium storing computer programs, where the programs are executed by a processor to perform the steps of the above method of determining a TAC obtaining mode.

A specific embodiment of the method of determining a TAC obtaining mode is described below, which can be applied to a terminal. The method includes the following steps:

determining a first TAC obtaining mode supported by a network-side device;

determining a second TAC obtaining mode supported by the terminal;

based on the first TAC obtaining mode and the second TAC obtaining mode, determining a mode of obtaining a target TAC.

In an embodiment, the first TAC obtaining mode and the second TAC obtaining mode include at least one of: the network-based obtaining TAC mode or the terminal-based obtaining TAC mode.

In an embodiment, determining the first TAC obtaining mode supported by the network-side device includes:

in response to determining that a TAC broadcast by the network-side device is received, determining the first TAC obtaining mode supported by the network-side device at least as the network-based obtaining TAC mode; or, in response to determining that a TAC broadcast by the network-side device is not received, determining the first TAC obtaining mode supported by the network-side device only as the terminal-based obtaining TAC mode.

In an embodiment, determining the mode of obtaining the target TAC includes: in response to determining that the first TAC obtaining mode at least includes the network-based obtaining TAC mode and the second TAC obtaining mode is the network-based obtaining TAC mode, determining to obtain the target TAC by the network-based obtaining TAC mode; or, in response to determining that the first TAC obtaining mode at least includes the network-based obtaining TAC mode and the second TAC obtaining mode includes the network-based obtaining TAC mode and the terminal-based obtaining TAC mode, determining to obtain the target TAC by the network-based obtaining TAC mode or by the terminal-based obtaining TAC mode; or, in response to determining that the first TAC obtaining mode at least includes the network-based obtaining TAC mode and the second TAC obtaining mode is the terminal-based obtaining TAC mode, determining to obtain the target TAC by the terminal-based obtaining TAC mode.

In an embodiment, in response to determining that the first TAC obtaining mode at least includes the network-based obtaining TAC mode and the second TAC obtaining mode includes the network-based obtaining TAC mode and the terminal-based obtaining TAC mode, determining to obtain the target TAC by the network-based obtaining TAC mode or by the terminal-based obtaining TAC mode includes: obtaining the target TAC by the network-based obtaining TAC mode.

In an embodiment, in response to determining that the first TAC obtaining mode at least includes the network-based obtaining TAC mode and the second TAC obtaining mode comprises the network-based obtaining TAC mode and the terminal-based obtaining TAC mode, determining to obtain the target TAC by the network-based obtaining TAC mode or by the terminal-based obtaining TAC mode includes: reporting a TAI list to the network-side device;

receiving indication information from the network-side device;

according to the indication information, determining to obtain the target TAC by the network-based obtaining TAC mode or by the terminal-based obtaining TAC mode.

In an embodiment, according to the indication information, determining to obtain the target TAC by the network-based obtaining TAC mode or by the terminal-based obtaining TAC mode includes:

according to the indication information, determining whether the network-side device supports the terminal-based obtaining TAC mode;

in response to determining that the network-side device does not support the terminal-based obtaining TAC mode, applying the network-based obtaining TAC mode; or, in response to determining that the network-side device supports the terminal-based obtaining TAC mode, applying the terminal-based obtaining TAC mode.

In an embodiment, according to the indication information, determining whether the network-side device supports the terminal-based obtaining TAC mode includes:

in response to determining that the indication information indicates that the TAC in a received TAI list configured by the network-side device is a network-broadcast TAC, determining the network-side device does not support the terminal-based obtaining TAC mode;

in response to determining that the indication information indicates that the TAC in the received TAI list configured by the network-side device is determined by the network-side device based on the TAI list reported by the terminal, determining the network-side device supports the terminal-based obtaining TAC mode.

In an embodiment, in response to determining that the first TAC obtaining mode at least includes the network-based obtaining TAC mode and the second TAC obtaining mode is the terminal-based obtaining TAC mode, determining to obtain the target TAC by the terminal-based obtaining TAC mode includes:

reporting a TAI list to the network-side device;

receiving a TAI list configured by the network-side device;

in response to determining that the TAI list received from the network-side device and the TAI list reported by the terminal are same, obtaining the target TAC by the terminal-based obtaining TAC mode.

In an embodiment, the method further includes the following step:

in response to determining that the TAI list received from the network and the TAI list reported by the terminal are different, receiving indication information for indicating that the network-side device supports the terminal-based obtaining TAC mode from the network-side device, and obtaining the target TAC by the terminal-based obtaining TAC mode.

In an embodiment, the method further includes the following step:

in response to determining that the first TAC obtaining mode only is the terminal-based obtaining TAC mode, and the second TAC obtaining mode does not include the terminal-based obtaining TAC mode, sending to the network-side device auxiliary information for indicating the network-side device to, at the time of paging a terminal, determine a cell where the terminal is located based on the auxiliary information; or, in response to determining that the first TAC obtaining mode only is the terminal-based obtaining TAC mode and the second TAC obtaining mode includes the terminal-based obtaining TAC mode, obtaining the target TAC by the terminal-based obtaining TAC mode.

In an embodiment, the auxiliary information includes: a position and a moving speed of the terminal.

In an embodiment, determining the first TAC obtaining mode supported by the network-side device includes:

receiving indication information from a base station, and determining the first TAC obtaining mode supported by the network-side device as one of:

the network-based obtaining TAC mode;

the network-based obtaining TAC mode and the terminal-based obtaining TAC mode; and the terminal-based obtaining TAC mode.

In an embodiment, determining a mode of obtaining the target TAC includes:

in response to determining that the first TAC obtaining mode only is the terminal-based obtaining TAC mode or the network-based obtaining TAC mode, determining to obtain the target TAC by using the first TAC obtaining mode; or, in response to determining that the first TAC obtaining mode is the network-based obtaining TAC mode and the terminal-based obtaining TAC mode, obtaining the target TAC by the second TAC obtaining mode.

In an embodiment, obtaining the target TAC by the second TAC obtaining mode includes:

in response to determining that the second TAC obtaining mode only is the terminal-based obtaining TAC mode or the network-based obtaining TAC mode, determining to obtain the target TAC by using the second TAC obtaining mode; or, in response to determining that the second TAC obtaining mode is the terminal-based obtaining TAC mode and the network-based obtaining TAC mode, obtaining the target TAC by using any one of the terminal-based obtaining TAC mode and the network-based obtaining TAC mode.

A specific embodiment of a method of determining a TAC obtaining mode is described below, which can be applied to a network-side device. The method includes the following steps:

sending indication information to a terminal, where the indication information is used to indicate a first TAC obtaining mode supported by the network-side device for the terminal to determine a mode of obtaining a target TAC.

In an embodiment, the first TAC obtaining mode includes at least one of: the network-based obtaining TAC mode or the terminal-based obtaining TAC mode.

In an embodiment, sending the indication information to the terminal includes: in a registration process of the terminal, sending the indication information to the terminal.

In an embodiment, sending the indication information to the terminal includes:

determining a second TAC obtaining mode supported by the terminal;

based on the second TAC obtaining mode, sending the indication information to the terminal.

In an embodiment, determining the second TAC obtaining mode supported by the terminal includes:

in response to determining that the terminal reports a TAI list, determining the second TAC obtaining mode includes the terminal-based obtaining TAC mode.

In an embodiment, the method further includes the following steps:

receiving terminal indication information from the terminal;

based on the terminal indication information, determining the second TAC obtaining mode includes one of:

the terminal-based obtaining TAC mode; and the terminal-based obtaining TAC mode and the network-based obtaining TAC mode.

In an embodiment, in response to determining that the second TAC obtaining mode includes the terminal-based obtaining TAC mode, sending the indication information to the terminal based on the second TAC obtaining mode includes: in response to determining that the first TAC obtaining mode is a network-based obtaining TAC mode, and the second TAC obtaining mode includes the network-based obtaining TAC mode, indicating, by the indication information, the network-side device does not support the terminal-based obtaining TAC mode such that the terminal determines to obtain the target TAC by the network-based obtaining TAC mode.

In an embodiment, the method further includes the following step:

sending a TAI list to the terminal, where the indication information indicates a TAC in the TAI list is a network-broadcast TAC, such that the terminal determines, based on the indication information, that the network-side device does not support the terminal-based obtaining TAC mode.

In an embodiment, in response to determining that the second TAC obtaining mode includes the terminal-based obtaining TAC mode, sending the indication information to the terminal based on the second TAC obtaining mode includes:

in response to the first TAC obtaining mode includes the terminal-based obtaining TAC mode, indicating, by the indication information, that the network-side device supports the terminal-based obtaining TAC mode, such that the terminal determines to obtain the target TAC by the terminal-based obtaining TAC mode.

In an embodiment, the method further includes the following step:

sending a TAI list to the terminal, where the indication information indicates a TAC in the TAI list is determined by the network based on position information of the terminal, such that the terminal determines, based on the indication information, that the network-side device supports the terminal-based obtaining TAC mode.

In an embodiment, in response to determining that the second TAC obtaining mode is the terminal-based obtaining TAC mode, sending the indication information to the terminal based on the second TAC obtaining mode includes:

in response to determining that the first TAC obtaining mode is the network-based obtaining TAC mode, indicating, by the indication information, that the network-side device does not support the terminal-based obtaining TAC mode, such that the terminal determines to obtain the target TAC by the terminal-based obtaining TAC mode.

In an embodiment, the method further includes the following step:

sending a TAI list to the terminal, where the indication information indicates the TAI list is the TAI list reported by the terminal, such that the terminal determines, based on the indication information, that the network-side device does not support the terminal-based obtaining TAC mode.

Sending the indication information to the terminal includes:

broadcasting the indication information to the terminal through a base station.

In an embodiment, the indication information includes one of that:

the first TAC obtaining mode is the network-based obtaining TAC mode;

the first TAC obtaining mode is the network-based obtaining TAC mode and the terminal-based obtaining TAC mode; and the first TAC obtaining mode is the terminal-based obtaining TAC mode.

In combination with specific technical details, the method and the mechanism of determining a TAC obtaining mode according to the present disclosure are summarized below.

1. If the network supports the network-based obtaining TAC mode, the network broadcasts TAC.

If the network broadcasts TAC, it only indicates that the network supports the network-based obtaining TAC mode and does not indicate the network does not support obtaining based on terminal.

After receiving the network-broadcast TAC, the terminal may determine the network at least supports the network-based obtaining TAC mode. Thus, the terminal may perform the following actions based on different capabilities.

1.1 If the terminal only supports the network-based obtaining TAC mode, the terminal obtains a registration area/tracking area by the network-based obtaining TAC mode.

1.2 The terminal supports the network-based obtaining TAC mode and the terminal-based obtaining TAC mode.

1.2.1 As long as the network broadcasts TAC, the terminal selects the network-based obtaining TAC mode, which is the same as in 1.1.

1.2.2 If the network broadcasts TAC, it indicates the network only supports the network-based obtaining TAC mode, and the terminal can only select the network-based obtaining TAC mode.

1.2.3 Based on the selection of the terminal, if the terminal selects the network-based obtaining TAC mode, it is the same as in 1.1. If the terminal selects the terminal-based obtaining TAC mode, the terminal obtains a TAC based on its position information and reports its current TAI to the network (for example, in a registration request message carrying the TAI) and supports the network-based obtaining TAC mode.

1.2.3.1 After the network receives the message, the network considers the terminal supports the terminal-based obtaining TAC mode. If the network does not support the terminal-based obtaining TAC mode, the network may configure a TAI list for the terminal to indicate not supporting the terminal-based obtaining TAC mode (for example, in the registration accept message). The indication may be an explicit indication or an implicit indication (indicating the TAC in the TAI list is the network-broadcast TAC). After receiving the TAI list and the indication information, the terminal re-obtains a TAC broadcast by gNB and confirms TAI list.

1.2.3.2 After the network receives the message, the network considers the terminal supports the terminal-based obtaining TAC mode. If the network supports the terminal-based obtaining TAC mode, the network configures a TAI list for the terminal to indicate supporting the terminal-based obtaining TAC mode (for example, in a registration accept message). The indication may be an explicit indication or an implicit indication (indicating the TAC in the TAI list is the TAC obtained by the terminal based on its position information).

1.3 If the terminal only supports the terminal-based obtaining TAC mode, the terminal selects the terminal-based obtaining TAC mode, obtains the TAC based on its position information, reports its current TAI to the network (for example, in a registration request message carrying TAI) and indicates to the network that it only supports the terminal-based obtaining TAC mode.

1.3.1 If the network does not support the terminal-based obtaining TAC mode, the network configures a TAI list for the terminal, where the TAI list can only include the TAIs reported by the terminal.

1.3.2 If the network supports the terminal-based obtaining TAC mode, the network configures a TAI list for the terminal to indicate the TAC in the current TAI list is the TAC obtained by terminal based on its position information.

2. The network only supports the terminal-based obtaining TAC mode and the network does not broadcast TAC.

Based on the network not broadcasting TAC, the terminal determines the network does not support the network-based obtaining TAC mode. The terminal can perform the following actions based on different capabilities.

2.1 The terminal only supports the network-based obtaining TAC mode. The terminal reports auxiliary information to the network to assist the network in paging the terminal, and indicates to the network that the terminal only supports the network-based obtaining TAC mode. The auxiliary information may include position information, moving speed/direction, and type of the terminal; for example, the above information is reported in the registration request.

2.2 The terminal supports the terminal-based obtaining TAC mode. The terminal includes the current TAI in the registration request. Thus, the network considers the terminal supports the terminal-based obtaining TAC mode. The network configures a TAI list for the terminal in the registration accept message.

3. The network indicates, by an explicit indication, a currently-supported mode of obtaining TAC by the terminal.

3.1 If the network only supports the network-based obtaining TAC mode, the network broadcasts TAC and indicates the network supports the network-based obtaining TAC mode.

3.2 If the network only supports the terminal-based obtaining TAC mode, the network does not broadcast TAC and indicates the network does not support the network-based obtaining TAC mode.

3.3 If the network supports the network-based obtaining TAC mode and the terminal-based obtaining TAC mode, the network broadcasts TAC and indicates the network supports the network-based obtaining TAC mode and the terminal-based obtaining TAC mode.

The terminal may select a mode of obtaining TAC based on the indication of the network.

Corresponding to 3.1, the terminal selects the network-based obtaining TAC mode.

Corresponding to 3.2, the terminal selects the terminal-based obtaining TAC mode.

Corresponding to 3.3, the terminal selects any one TAC obtaining mode. Two specific embodiments will be further introduced below.

In an embodiment, a. network only supports the network-based obtaining TAC mode, and the gNB (base station) broadcasts TAC; b. terminal, based on gNB broadcasting TAC, determines the network at least supports the network-based obtaining TAC mode; c. terminal supports the network-based obtaining TAC mode and the terminal-based obtaining TAC mode, and the terminal selects the terminal-based obtaining TAC mode; d. terminal obtains a TAC based on its position information, reports a TAI to the network in a network registration process and indicates to the network that it supports the network-based obtaining TAC mode; e. network confirms the terminal supports two solutions based on the information reported by the terminal, configures a TAI list for the terminal and indicates the network only supports the network-based obtaining TAC mode. The indication may be an explicit indication or an implicit indication (indicating the TAC in the TAI list is the TAC broadcast by the network); f. terminal receives the information from the above e, re-obtains a TAC broadcast by gNB and confirms a TAI list.

In an embodiment, a. gNB broadcasts TAC and clearly indicates in the system message that the network supports the network-based obtaining TAC mode and the terminal-based obtaining TAC mode; b. terminal, based on the system message, determines the network supports the network-based obtaining TAC mode and the terminal-based obtaining TAC mode; c. terminal supports the network-based obtaining TAC mode and the terminal-based obtaining TAC mode, and the terminal selects the terminal-based obtaining TAC mode; d. terminal, based on its position information, obtains a TAC, reports a TAI to the network in a network registration process, and indicates to the network that it also supports the network-based obtaining TAC mode; e. network configures a TAI list for the terminal, and indicates to the terminal in the registration accept message that the TAC in the TAI list is the TAC corresponding to the position information.

Figure 10:
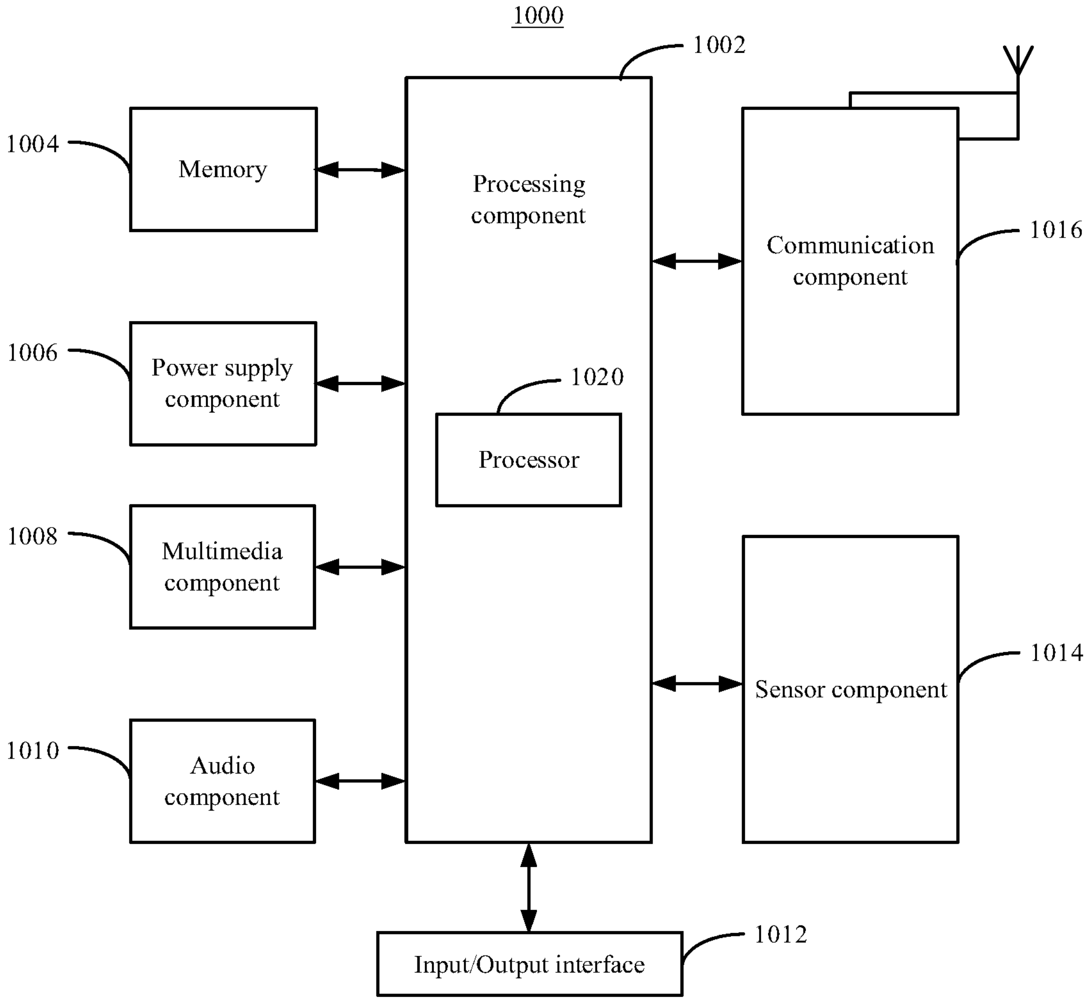
FIG. 10 is a schematic block diagram illustrating a device 1000 for determining a TAC obtaining mode according to an embodiment of the present disclosure.

FIG. 10 is a schematic block diagram of a device 1000 for determining a TAC obtaining mode according to an embodiment of the present disclosure. For example, the device 1000 may be a mobile phone, a computer, a digital broadcast terminal, a message transceiver, a game console, a tablet device, a medical device, a fitness device, a personal digital assistant, and the like.

As shown in FIG. 10, the device 1000 may include one or more of the following components: a processing component 1002, a memory 1004, a power supply component 1006, a multimedia component 1008, an audio component 1010, an input/output (I/O) interface 1012, a sensor component 1014 and a communication component 1016.

The processing component 1002 generally controls the overall operations of the device 1000, such as operations associated with display, phone calls, data communications, camera operations, and recording operations. The processing component 1002 may include one or more processors 1020 to execute instructions to complete all or part of the steps of the above methods. In addition, the processing component 1002 may include one or more modules that facilitate the interaction between the processing component 1002 and other components. For example, the processing component 1002 may include a multimedia module to facilitate the interaction between the multimedia component 1008 and the processing component 1002.

The memory 1004 is configured to store various types of data to support the operation of the device 1000. Examples of such data include instructions for any application or method operated on the device 1000, contact data, phonebook data, messages, pictures, videos, and so on. The memory 1004 may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or compact disk.

The power supply component 1006 supplies power for different components of the device 1000. The power supply component 1006 may include a power supply management system, one or more power supplies, and other components associated with generating, managing, and distributing power for the device 1000.

The multimedia component 1008 includes a screen that provides an output interface between the device 1000 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1008 includes a front camera and/or a rear camera. When the device 1000 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1010 is configured to output and/or input audio signals. For example, the audio component 1010 includes a microphone (MIC) configured to receive an external audio signal when the device 1000 is in an operation mode, such as a call mode, a recording mode, or a voice recognition mode. The received audio signal may be further stored in the memory 1004 or transmitted via the communication component 1016. In some examples, the audio component 1010 also includes a loudspeaker for outputting an audio signal.

The I/O interface 1012 provides an interface between the processing component 1002 and a peripheral interface module, which may be a keyboard, a click wheel, a button, or the like. These buttons may include, but are not limited to a home button, a volume button, a start button, and a lock button.

The sensor component 1014 includes one or more sensors for providing a status assessment in various aspects to the device 1000. For example, the sensor component 1014 may detect an open/closed state of the device 1000, and the relative positioning of components, for example, the component is a display and a keypad of the device 1000. The sensor component 1014 may also detect a change in position of the device 1000 or a component of the device 1000, the presence or absence of a user in contact with the device 1000, the orientation or acceleration/deceleration of the device 1000, and a change in temperature of the device 1000. The sensor component 1014 may include a proximity sensor configured to detect the presence of nearby objects without any physical contact. The sensor component 1014 may also include a light sensor, such as a CMOS or CCD image sensor, for use in imaging applications. In some examples, the sensor component 1014 may also include an acceleration sensor, a gyro sensor, a magnetic sensor, a pressure sensor, or a temperature sensor.

The communication component 1016 is configured to facilitate wired or wireless communication between the device 1000 and other devices. The device 1000 may access a wireless network based on a communication standard, such as WiFi, 2G, 3G, 4G LTE, 5G NR or a combination thereof. In an example, the communication component 1016 receives broadcast signals or broadcast-associated information from an external broadcast management system via a broadcast channel. In an example, the communication component 1016 also includes a near field communication (NFC) module to facilitate short-range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the device 1000 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above method of determining a TAC obtaining mode.

In an example, there is provided a non-transitory computer-readable storage medium storing instructions. The instructions may be executed by the processor 1020 of the device 1000 to complete the above method of determining a TAC obtaining mode. For example, the non-transitory computer-readable storage medium may be a read-only memory (ROM), a random access memory (RAM), CD-ROM, a magnetic tape, a floppy disk, an optical data storage device, and so on.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only. Without departing from the technical direction and technical key points of the present disclosure, based on different requirements and conditions of persons skilled in the art, deletion, replacement or combination may be performed on the steps of different embodiments of the present disclosure. It should be understood that these deletions, replacements, or combinations are also included in the scope recorded and disclosed by the present disclosure.

It should be understood that the present disclosure is not limited to the precise structure which have been described above and shown in the drawings and can be modified and changed without departing from the scope of the present disclosure.

It shall be noted that the relational terms such as "first" and "second" used herein are merely intended to distinguish one entity or operation from another entity or operation rather than to require or imply any such actual relation or order existing between these entities or operations. Also, the term "including," "containing," or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and an apparatus provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A method of determining a tracking area code (TAC) obtaining mode, applied to a terminal and comprising:

determining a first TAC obtaining mode supported by a network-side device;

determining a second TAC obtaining mode supported by the terminal; and based on the first TAC obtaining mode and the second TAC obtaining mode, determining a mode of obtaining a target TAC:

wherein the first TAC obtaining mode and the second TAC obtaining mode comprise at least one of a network-based obtaining TAC mode or a terminal-based obtaining TAC mode;

wherein determining the mode of obtaining the target TAC comprises:

in response to determining that the first TAC obtaining mode at least comprises the network-based obtaining TAC mode and the second TAC obtaining mode is the terminal-based obtaining TAC mode, determining to obtain the target TAC by the terminal-based obtaining TAC mode;

wherein in response to determining that the first TAC obtaining mode at least comprises the network-based obtaining TAC mode and the second TAC obtaining mode is the terminal-based obtaining TAC mode, determining to obtain the target TAC by the terminal-based obtaining TAC mode comprises:

reporting a tracking area identity (TAI) list to the network-side device;

receiving a TAI list configured by the network-side device; and in response to determining that the TAI list received from the network-side device and the TAI list reported by the terminal are same, obtaining the target TAC by the terminal-based obtaining TAC mode.

2. The method of claim 1, wherein determining the first TAC obtaining mode supported by the network-side device comprises:

in response to determining that a TAC broadcast by the network-side device is received, determining that the first TAC obtaining mode supported by the network-side device at least comprises the network-based obtaining TAC mode; or, in response to determining that a TAC broadcast by the network-side device is not received, determining that the first TAC obtaining mode supported by the network-side device only comprises the terminal-based obtaining TAC mode.

3. The method of claim 1, further comprising:

in response to determining that the TAI list received from the network and the TAI list reported by the terminal are different, receiving indication information for indicating that the network-side device supports the terminal-based obtaining TAC mode from the network-side device, and obtaining the target TAC by the terminal-based obtaining TAC mode.

4. The method of claim 2, further comprising:

in response to determining that the first TAC obtaining mode only comprises the terminal-based obtaining TAC mode, and the second TAC obtaining mode does not comprise the terminal-based obtaining TAC mode, sending to the network-side device auxiliary information, wherein the auxiliary information is used for indicating the network-side device to, at the time of paging the terminal, determine a cell where the terminal is located based on the auxiliary information; or, in response to determining that the first TAC obtaining mode only comprises the terminal-based obtaining TAC mode and the second TAC obtaining mode comprises the terminal-based obtaining TAC mode, obtaining the target TAC by the terminal-based obtaining TAC mode, wherein the auxiliary information comprises a position and a moving speed of the terminal.

5. The method of claim 1, wherein determining the first TAC obtaining mode supported by the network-side device comprises:

receiving indication information from a base station, and determining the first TAC obtaining mode supported by the network-side device as one of:

the network-based obtaining TAC mode;

the network-based obtaining TAC mode and the terminal-based obtaining TAC mode; and the terminal-based obtaining TAC mode.

6. The method of claim 5, wherein determining the mode of obtaining the target TAC comprises:

in response to determining that the first TAC obtaining mode only comprises the terminal-based obtaining TAC mode or the network-based obtaining TAC mode, determining to obtain the target TAC by using the first TAC obtaining mode; or, in response to determining that the first TAC obtaining mode comprises the network-based obtaining TAC mode and the terminal-based obtaining TAC mode, obtaining the target TAC by the second TAC obtaining mode; wherein obtaining the target TAC by the second TAC obtaining mode comprises:

in response to determining that the second TAC obtaining mode only comprises the terminal-based obtaining TAC mode or the network-based obtaining TAC mode, determining to obtain the target TAC by using the second TAC obtaining mode; or, in response to determining that the second TAC obtaining mode comprises the terminal-based obtaining TAC mode and the network-based obtaining TAC mode, obtaining the target TAC by using any one of the terminal-based obtaining TAC mode and the network-based obtaining TAC mode.

7. A method of determining a tracking area code (TAC) obtaining mode, applied to a network-side device and comprising:

sending indication information to a terminal, wherein the indication information is used to indicate a first TAC obtaining mode supported by the network-side device for the terminal to determine a mode of obtaining a target TAC;

wherein the first TAC obtaining mode comprises at least one of a network-based obtaining TAC mode or a terminal-based obtaining TAC mode;

wherein sending the indication information to the terminal comprises:

determining a second TAC obtaining mode supported by the terminal; and based on the second TAC obtaining mode, sending the indication information to the terminal;

wherein determining the second TAC obtaining mode supported by the terminal comprises:

in response to determining that the terminal reports a tracking area identity (TAI) list, determining the second TAC obtaining mode comprises the terminal-based obtaining TAC mode;

wherein in response to determining that the second TAC obtaining mode comprises the terminal-based obtaining TAC mode, sending the indication information to the terminal based on the second TAC obtaining mode comprises:

in response to determining that the first TAC obtaining mode comprises the network-based obtaining TAC mode, indicating, by the indication information, that the network-side device does not support the terminal-based obtaining TAC mode, such that the terminal determines to obtain the target TAC by the terminal-based obtaining TAC mode;

wherein in response to determining that the second TAC obtaining mode comprises the terminal-based obtaining TAC mode, sending the indication information to the terminal based on the second TAC obtaining mode comprises:

in response to determining that the first TAC obtaining mode comprises the network-based obtaining TAC mode, and the second TAC obtaining mode comprises the network-based obtaining TAC mode, indicating, by the indication information, the network-side device does not support the terminal-based obtaining TAC mode such that the terminal determines to obtain the target TAC by the network-based obtaining TAC mode.

8. The method of claim 7, wherein sending the indication information to the terminal comprises:

in a registration process of the terminal, sending the indication information to the terminal.

9. The method of claim 7, further comprising:

receiving terminal indication information from the terminal; and based on the terminal indication information, determining the second TAC obtaining mode comprises one of:

the terminal-based obtaining TAC mode; and the terminal-based obtaining TAC mode and the network-based obtaining TAC mode.

10. The method of claim 7, further comprising:

sending a TAI list to the terminal, wherein the indication information indicates a TAC in the TAI list is a network-broadcast TAC, such that the terminal determines, based on the indication information, that the network-side device does not support the terminal-based obtaining TAC mode.

11. The method of claim 7, wherein sending the indication information to the terminal comprises:

broadcasting the indication information to the terminal through a base station, wherein the indication information comprises one of that:

the first TAC obtaining mode comprises the network-based obtaining TAC mode;

the first TAC obtaining mode comprises the network-based obtaining TAC mode and the terminal-based obtaining TAC mode; and the first TAC obtaining mode comprises terminal-based obtaining TAC mode.

12. An electronic device, comprising:

a processor;

a memory storing instructions executable by the processor;

wherein the processor is configured to perform operations comprising:

determining a first TAC obtaining mode supported by a network-side device; determining a second TAC obtaining mode supported by the terminal; and based on the first TAC obtaining mode and the second TAC obtaining mode, determining a mode of obtaining a target TAC;

wherein the first TAC obtaining mode and the second TAC obtaining mode comprise at least one of a network-based obtaining TAC mode or a terminal-based obtaining TAC mode; wherein determining the mode of obtaining the target TAC comprises: in response to determining that the first TAC obtaining mode at least comprises the network-based obtaining TAC mode and the second TAC obtaining mode is the terminal-based obtaining TAC mode, determining to obtain the target TAC by the terminal-based obtaining TAC mode;

wherein in response to determining that the first TAC obtaining mode at least comprises the network-based obtaining TAC mode and the second TAC obtaining mode is the terminal-based obtaining TAC mode, determining to obtain the target TAC by the terminal-based obtaining TAC mode comprises:

reporting a TAI list to the network-side device;

receiving a tracking area identity (TAI) list configured by the network-side device; and in response to determining that the TAI list received from the network-side device and the TAI list reported by the terminal are same, obtaining the target TAC by the terminal-based obtaining TAC mode.

13. An electronic device, comprising:

a processor;

a memory storing instructions executable by the processor;

wherein the processor is configured to perform the method of determining a TAC obtaining mode according to claim 7.

* * * * *